US006989205B2

(12) United States Patent
Paddison

(10) Patent No.: US 6,989,205 B2
(45) Date of Patent: Jan. 24, 2006

(54) HYDROPHILIC SIDE-CHAIN POLYMER ELECTROLYTE MEMBRANES

(75) Inventor: Stephen Paddison, Los Alamos, NM (US)

(73) Assignee: Motorola, Inc., Schaumburg, IL (US)

( * ) Notice: Subject to any disclaimer, the term of this patent is extended or adjusted under 35 U.S.C. 154(b) by 424 days.

(21) Appl. No.: 10/284,909

(22) Filed: Oct. 31, 2002

(65) Prior Publication Data

US 2004/0086763 A1 May 6, 2004

(51) Int. Cl.
*H01M 8/00* (2006.01)
*H01M 2/00* (2006.01)
*H01M 2/02* (2006.01)
*G01N 19/02* (2006.01)

(52) U.S. Cl. .......................... 429/12; 429/13; 429/34; 73/9

(58) Field of Classification Search ................ 73/9; 429/34, 12, 13
See application file for complete search history.

(56) References Cited

U.S. PATENT DOCUMENTS 4,358,545 A * 11/1982 Ezzell et al. .................. 521/27

OTHER PUBLICATIONS

Stephen J. Paddison et al., "A Statistical Mechanical Model of Proton and Water Transport in a Proton Exchange Membrane," Journal of The Electrochemical Society, 147 (2), 2000, pp. 617-626.

Stephen J. Paddison et al., "Ion and Water Transport in a Nafion Membrane Pore: A Statistical Mechanical Model With Molecular Structure," Electrochemical Society Proceedings, vol. 98-27, pp. 106-120.

Curt M. Breneman et al., "Determining Atom-Centered Monopoles From Molecular Electrostatic Potentials. The Need for High Sampling Density in Formamide Conformational Analysis," Journal of Computational Chemistry, vol. 11, No. 3, 1990, pp. 361-373.

Stephen J. Paddison, "Proton Friction and Diffusion Coefficients in Hydrated Polymer Electrolyte Membranes: Computations With a Non-Equilibrium Statistical Mechanical Model," Journal of Chemical Physics, vol. 115, No. 16, Oct. 22, 2001, pp. 7753-7761.

H. Bernhard Schlegel, "Optimization of Equilibrium Geometries and Transition Structures," Journal of Computational Chemistry, vol. 3, No. 2, 1982, pp. 214-218.

Axel D. Becke, "Density-Functional Thermochemistry. III. The Role of Exact Exchange," J. Chem. Phys. 98 (7), Apr. 1, 1993, pp. 5648-5652.

P.C. Hariharan et al., "The Influence of Polarization Functions on Molecular Orbital Hydrogenation Energies," Theoret. Chiro. Acta (Berl.) 28, 1973, pp. 213-222.

* cited by examiner

*Primary Examiner*—Patrick Joseph Ryan
*Assistant Examiner*—Julian Mercado

(57) ABSTRACT

Exemplary methods for the characterization of proton dissociation and transport for hydrophilic components of hydrated Polymer Electrolyte Membranes (PEM's) is described. Disclosed features and specifications may be variously implemented, controlled, adapted or otherwise optionally modified to improve differential hydrophilicity of the sidechain of any ionomeric PEM material. A representative embodiment of the present invention generally provides for the amelioration of electro-osmotic drag of water by protons, for example, in Direct Methanol Fuel Cells.

10 Claims, 6 Drawing Sheets

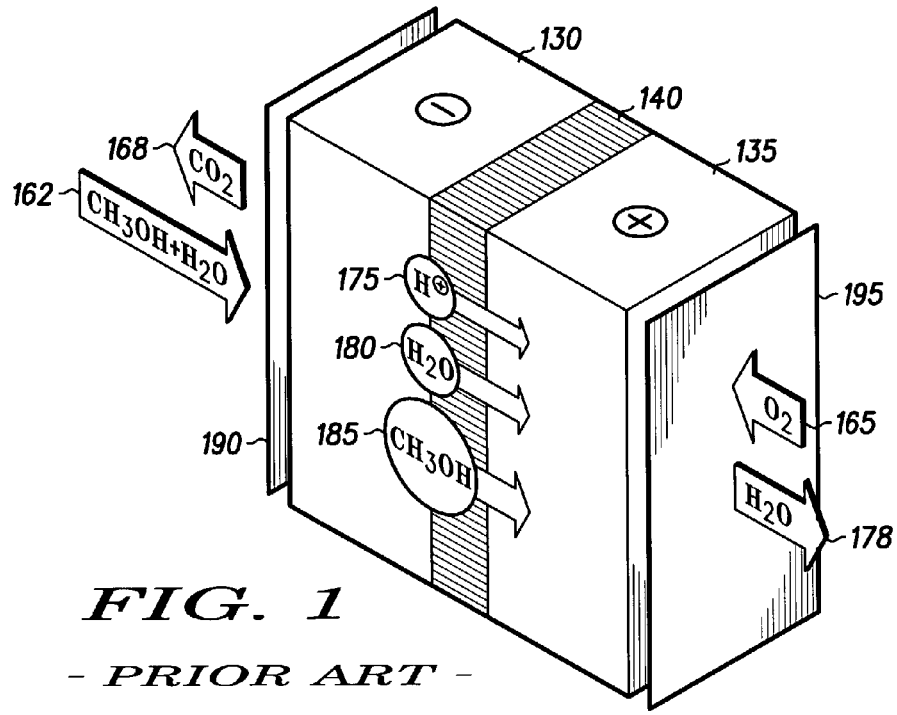
FIG. 1
*- PRIOR ART -*
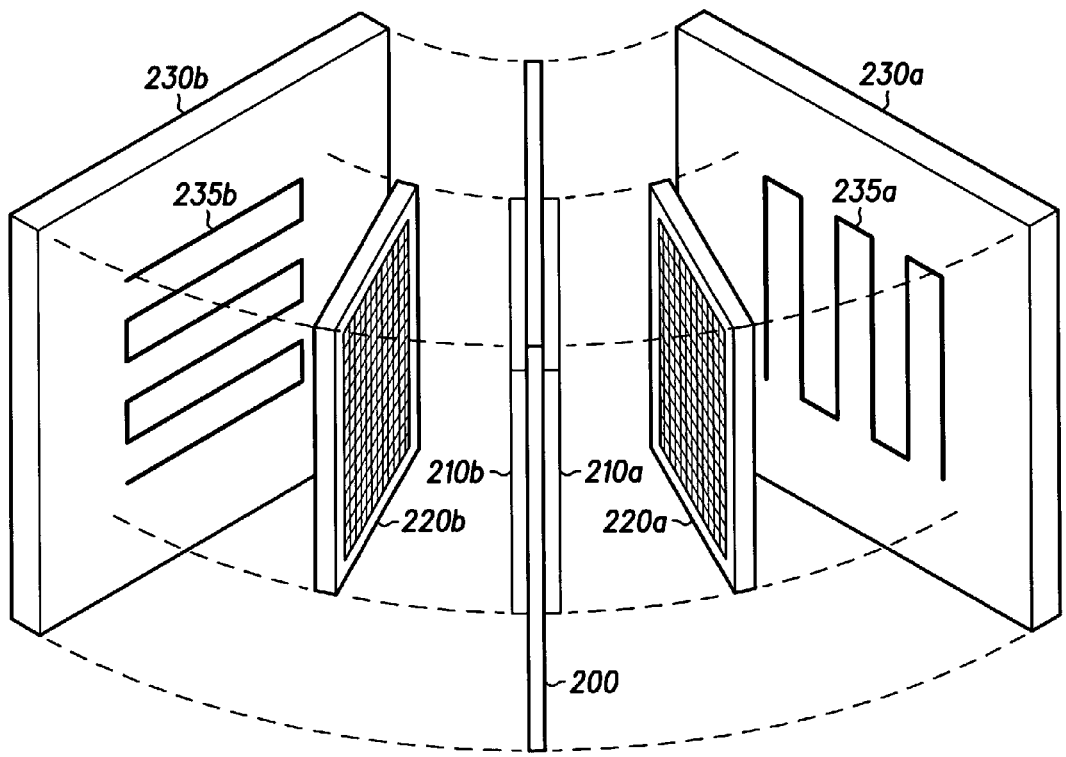
*- PRIOR ART -*  FIG. 2

HYDROPHILIC SIDE-CHAIN POLYMER ELECTROLYTE MEMBRANES

FIELD OF INVENTION

The present invention generally concerns fuel cell technology; and more particularly, in one representative and exemplary embodiment, the characterization of proton dissociation and transport for hydrophilic components of Polymer Electrolyte Membranes (PEM's). A PEM material comprising a novel differential sidechain chemical composition is also disclosed as inter alia preventing or otherwise ameliorating electro-osmotic drag as the membrane material experiences increased swelling upon permeation with, for example, aqueous methanol.

BACKGROUND

Fuel cells are electrochemical cells in which a free energy change resulting from a fuel oxidation is converted into electrical energy. The earliest fuel cells were first constructed by William Grove in 1829 with later development efforts resuming in the late 1930's with the work of F. T. Bacon. In early experiments, hydrogen and oxygen gas were bubbled into compartments containing water that were connected by a barrier through which an aqueous electrolyte was permitted to pass. When composite graphite/platinum electrodes were submerged into each compartment and the electrodes were conductively coupled, a complete circuit was formed and redox reactions took place in the cell: hydrogen gas was oxidized to form protons at the anode (e.g., "hydrogen electrode") and electrons were liberated to flow to the cathode (e.g., "oxygen electrode") where they subsequently combined with oxygen.

Since that time, interest in the development of viable commercial and consumer-level fuel cell technology has been renewed. In addition to various other benefits compared with conventional methods, fuel cells generally promise improved power production with higher energy densities. For example, a typical hydrogen-oxygen cell operating at about 250° C. and a pressure of about 50 atmospheres yields approximately 1 volt of electric potential with the generation of water and a small quantity of thermal energy as byproducts. More recently, however, modern Polymer Electrolyte Membrane Fuel Cells (PEMFC's) operating at much lower temperatures and pressures (i.e., on the order of about 80° C. and about 1.3 atmospheres) have been observed to produce nearly the same voltage potential.

An additional advantage of fuel cells is that they generally have a higher energy density and are intrinsically more efficient than methods involving indirect energy conversion. In fact, fuel cell efficiencies have been typically measured at nearly twice those of thermoelectric conversion methods (i.e., fossil fuel combustion heat exchange).

With respect to portable power supply applications, fuel cells function under different principles as compared with standard batteries. As a standard battery operates, various chemical components of the electrodes are depleted over time. In a fuel cell, however, as long as fuel and oxidant are continuously supplied, the cell's electrode material is not consumed and therefore will not run down or require recharging or replacement.

One class of fuel cells currently under development for general consumer use are hydrogen fuel cells, wherein hydrogen-rich compounds (i.e., methanol) are used to fuel the redox reaction. As chemical fuel species are oxidized at the anode, electrons are liberated to flow through the external circuit. The remaining positively-charged ions (i.e., protons) then move through the electrolyte toward the cathode where they are subsequently reduced. The free electrons combine with, for example, protons and oxygen to produce water—an environmentally clean byproduct.

Current interest in perfluorinated ionomers, such as, for example, NAFION® (a perfluorinated polymer available from DuPont Microcircuit Materials, E. I. Du Pont de Nemours and Company, 14 T. W. Alexander Drive, Research Triangle Park, N.C., USA), stems from their potential use as polymer electrolyte membranes in fuel cell applications. See, for example, R. Lemons, J. Power Sources 29, 251 (1990). NAFION is a phase separated material with a crystalline region consisting of a hydrophobic TEFLON® (also available from DuPont Microcircuit Materials, E. I. Du Pont de Nemours and Company, 14 T. W. Alexander Drive, Research Triangle Park, N.C., USA) backbone and a hydrophilic ionic domain comprising randomly attached long pendant chains terminating with sulfonic acid groups. The terminal acid functionality is generally analogous to that of trifluoromethane sulfonic acid (e.g., triflic acid).

NAFION belongs to a class of polymers referred to as ion-containing polymers (e.g., 'jonomers'). Although extensive work has been undertaken to characterize ionomers, the state and structure of ion aggregation and the resulting modifications occurring upon hydration have not been well understood, even though the importance of such considerations has generally been appreciated. See, for example, A. Eisenberg, H. L. Yeager (Eds.), Perfluorinated Ionomer Membranes, *ACS Symp. Ser.* 180, American Chemical Society, Washington, D.C. (1982).

Early small-angle x-ray scattering and thermo-rheological studies suggest that the ions in NAFION are clustered, containing some fluoro-carbon material. See, for example, S. C. Yeo, A. Eisenberg, *J. Appl. Polymer Sci.* 21, 1875 (1977). Ion clustering was further supported by both wide- and small-angle diffraction studies on hydrolyzed NAFION. See, for example, T. D. Gierke et al., *J. Polymer Sci. Polymer Physics,* Ed. 19, 1687 (1981); W. Y. Hsu, T. D. Gierke, *Macromolecules* 15, 101 (1982); and W. Y. Hsu, T. D. Gierke, *J. Memb. Sci.* 13, 307 (1983). This work provided a microstructure model where the structure of the system was proposed as consisting of an inverted micelle with $-SO_3$ groups forming hydrated clusters embedded in the fluorocarbon phase with diameters from 40 to 50 Å. It was further concluded from infrared studies of water ($H_2O$, $D_2O$ and HDO) in NAFION that the hydrated ion clusters were either much smaller than earlier estimated or were highly non-spherical in shape with frequent local intrusions of the fluorocarbon phase. See, for example, M. Falk, Can. J. Chem. 58, 1495 (1980). This work seemed to indicate that a substantial proportion of water molecules were exposed to the fluorocarbon environment. More recently, however, through reexamination of the data, a lamellar morphology was proposed for NAFION that, upon hydrolysis, creates polar sulfonic acid domains of relatively large surface area parallel to one another and connected by tie molecules. See, for example, M. H. Litt, Polymer Preprints 38, 80 (1997). A similar micelle structure was experimentally observed for NAFION solubilized in DMF. See, for example, A. V. Rebrov et al., Polymer Science U.S.S.R. 32, 251 (1990).

As NAFION membranes may function both as separators and electrolytes in fuel cell applications, the overall performance of the fuel cell is strongly influenced by the conductivity of the membrane, which itself is a function of the state of hydration of the membrane. See, for example, T. A. Zawodzinski et al., *J. Electro-Chem. Soc.* 95, 6040 (1991);

T. E. Springer et al., *J. Electro-Chem. Soc.* 138, 2334 (1991); T. A. Zawodzinski et al., *J. Electro-Chem. Soc.* 140, 1981 (1993); and T. A. Zawodzinski et al., *Solid State Ionics* 60, 1993 (1993). The water content of the membrane may largely be determined inter alia by the interplay of at least three processes: (a) water absorption by the membrane; (b) transport of water through the hydrated membrane by means of, for example, the protonic current (e.g., electro-osmotic drag); and (c) water diffusion effected by means of, for example, water activity gradients. Experimental measurements of electro-osmotic drag for various sulfonated membranes over a wide range of water content have suggested that wall effects tend to dominate proton transport and that the mechanism responsible involves the tethering of sulfonic acid groups bound to water. Until recently, however, no molecular-level understanding was available for electro-osmosis. See, for example, S. J. Paddison, T. A. Zawodzinski, *Solid State Ionics* 113–115, 333–340 (1998).

In Direct Methanol Fuel Cells (DMFC's), aqueous methanol ($CH_3OH$) is introduced at the anode where the fuel is electrochemically oxidized to produce $CO_2$, protons and electrons. With conventional catalysts (typically carbon supported platinum or platinum alloys) and under the current operating temperature limitations (on the order of about 110° C.) not all of the methanol is oxidized. Due to the miscible nature of water and methanol, along with the permeability of the Polymer Electrolyte Membrane (PEM), the latter is adsorbed by the membrane causing inter alia increased swelling (essentially due to an increase in the water concentration) of the membrane. During operation of the fuel cell, protonic current within the membrane drags water (e.g., 'electro-osmotic drag') from the anode to the cathode, which reduces the efficiency of the fuel cell by hindering the reduction reaction at the cathode (e.g., 'cathode flooding'). This, in turn, generally requires the utilization of relatively expensive water management techniques typically involving capture or return of water to the anode side of the DMFC. The electro-osmotic drag coefficient (e.g., the number of water molecules dragged per proton) typically increases substantially upon swelling of the membrane. Accordingly, despite the efforts of the prior art, one problem warranting resolution is the characterization of the increased electro-osmotic drag of water by protons in membranes used in the manufacture of PEMFC's. Accordingly, in one representative and exemplary aspect, the present invention proposes a molecular-based non-equilibrium statistical mechanical method for predicting diffusion coefficients for sulfonic acid based PEM's. Moreover, a representative novel ionomeric PEM material is described for preventing or otherwise ameliorating electro-osmotic drag.

SUMMARY OF THE INVENTION

In various representative aspects, the present invention provides a system and method for characterizing and subsequently customizing ionomeric membranes that generally tend not to experience substantial increases in electro-osmotic drag upon exposure to, for example, aqueous methanol. In an exemplary application, a novel ionomer is disclosed as inter alia exhibiting increased hydrophilicity upon swelling—generally without any substantial penalty in acidity and thus, consequent proton conductivity—such that increased protrusion of the sidechain may occur in the membrane water-filled pores with the terminal anionic groups generally preserving at least some "structuring" of the water while substantially preventing or otherwise ameliorating any increase in electro-osmosis.

The disclosed method for modeling of the dielectric saturation in Polymer Electrolyte Membranes (PEM's) demonstrates that with increased protrusion of the anionic groups within the membrane pores, the permittivity (i.e., dielectric constant) of the water generally decreases. The decrease in the dielectric constant (relative to bulk water) generally corresponds to the water being more constrained. Both the predictive values and experimental measurements have shown that under such conditions, electro-osmosis is minimized.

In application to NAFION and PEEKK membranes, at various levels of hydration, the present invention demonstrates improved predictive capability—without requiring the use of 'fitting parameters' and/or input from SAXS experiments or molecular orbital calculations. Diffusion coefficients determined in accordance with the method of the instant invention are generally observed to be in good agreement with experiment. Additionally, the instant system and method has demonstrated substantial sensitivity to the parameters of the domains (e.g., pores) within the PEM material where proton conduction generally occurs; including: sidechain length, length of pore, radius of pore, and distribution of sulfonic acid fixed sites within the pore.

Moreover, the instant invention also discloses a method for computing the permittivity of water as a function of pore parameters within PEM materials based on equilibrium statistical mechanics. The disclosed model has been applied to described inter alia the decrease in the dielectric constant of water molecules as they move from the center of the pore towards the wall of the pore. Results from the methods described herein (e.g., the modeling of proton transport and dielectric saturation in accordance with various embodiments of the present invention) suggest that ionomeric PEM's exhibiting similar hydrated morphologies (i.e., NAFION®, PEEKK and the like) will exhibit the highest conductivities for fixed sites generally distributed in a substantially homogeneous manner over the pore walls.

Optimized geometries for the chemical species of interest were determined by means of both ab initio Hartree-Fock theory and second order Møller-Plesset electron correlation corrections, and density functional theory with Becke's three parameter hybrid method. A representative custom-designed ionomer is disclosed as comprising a chemical structure derived from a series of ab initio molecular based calculations and simulations; namely, a polymer electrolyte membrane material having a novel sidechain for preventing or otherwise ameliorating increases in electro-osmotic drag when the material experiences increased swelling upon permeation with, for example, aqueous methanol. In one representative aspect, the present invention involves the tailoring of the sidechain (through alteration of the chemical functionalization of the sidechain) such that hydrophilicity of the intermediate portion of the sidechain is increased beyond that typically found in presently available PEM materials.

One representatively practical example of the present invention involves the incorporation of an ether oxygen (or oxygens) along the length of the sidechain of NAFION to introduce or otherwise improve hydrophilicity (e.g., the ability to form hydrogen bonds with water molecules). Another example of how the structure of NAFION may be altered is disclosed as comprising an alteration of the sidechain where the groups vicinal, geminal, etc. to the ether oxygen are changed from $CF_2$ to $CH_2$. The disclosed system and method may be readily and more generally adapted for use in the optimization and/or chemical functionalization of any ionomeric material, whether now known or otherwise hereafter described in the art. The disclosed alteration of NAFION is shown inter alia as dramatically increasing the tendency of the ether oxygen to form a hydrogen bond with, for example, a water molecule.

The increased differential hydrophilicity of the sidechain generally manifests itself as a representatively practical benefit, for example, when the ion-containing domains or pores swell by increasing the protrusion of the sidechains within the pores. Characterization of the permittivity of the water in the pores, in accordance with the methods disclosed in the instant invention, demonstrates that with increased protrusion of the sidechains, the transport of water by the protonic current is inhibited, thereby preventing or otherwise ameliorating increases in electro-osmotic drag. In addition, because the hydrophilicity of the sidechains may be custom designed so as to make the terminal part more hydrophilic than along the length of the sidechain, the conductivity of the membrane at lower water concentrations generally will not be reduced with the increased hydrophilicity of the sidechain.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the Claims.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

FIG. 1 generally depicts a schematic for a conventional Direct Methanol Fuel Cell (DMFC) in accordance with the prior art;

FIG. 2 generally depicts an integrated fuel cell assembly in accordance with the prior art;

Figure 3:
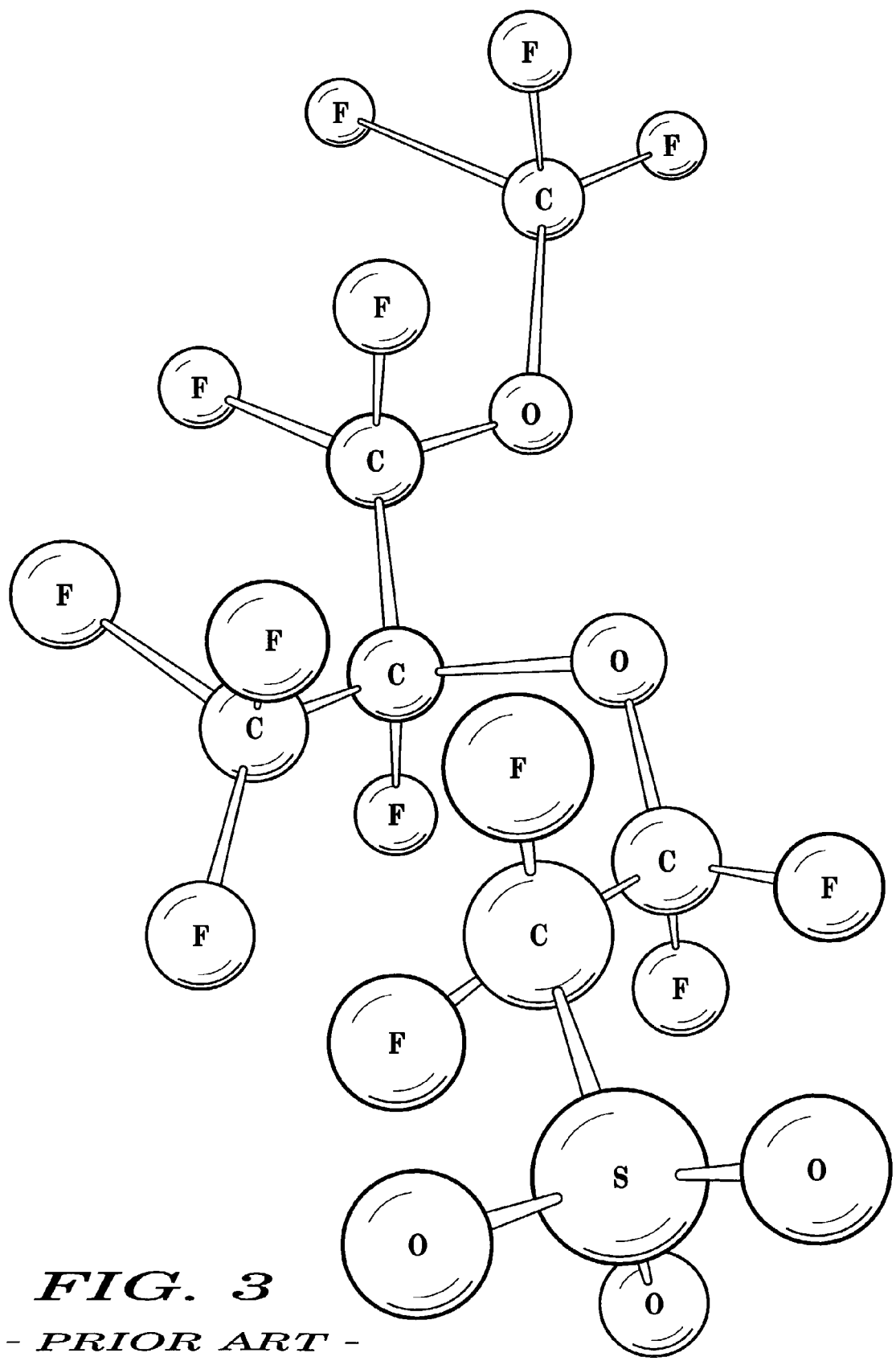
FIG. 3 generally depicts an energy-minimized chemical structure for a monomeric moiety of NAFION 117 in accordance with the prior art.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following descriptions are of exemplary embodiments of the invention and the inventor's conception of the best mode and are not intended to limit the scope, applicability or configuration of the invention in any way. Rather, the following description is intended to provide convenient illustrations for implementing various embodiments of the invention. As, will become apparent, changes may be made in the function and/or arrangement of any of the elements described in the disclosed exemplary embodiments without departing from the spirit and scope of the invention.

Various representative implementations of the present invention may be applied to any composition of matter, system and/or method for the characterization of proton dissociation and transport as they may relate to hydrophilic components of hydrated ionomeric materials. A detailed description of an exemplary application, namely a composition of matter and a method for altering the differential hydrophilicity of the sidechain of NAFION is provided as a specific enabling disclosure that may be readily generalized by skilled artisans to any application of the disclosed system and method in accordance with various embodiments of the present invention. Moreover, skilled artisans will appreciate that the principles of the present invention may be employed to ascertain and/or realize any number of other benefits associated with the characterization of proton dissociation and transport in Polymer Electrolyte Membrane materials such as, but not limited to: reduction of electro-osmotic drag; improvement of fuel cell efficiency; reduction of device weight and/or form-factor; and any other applications or benefits whether now known or hereafter developed or otherwise described in the art.

Fuel Cells

In the broadest sense, a fuel cell may be generally characterized as any device capable of converting the chemical energy of a supplied fuel directly into electrical energy by electrochemical reactions, This energy conversion corresponds to a free energy change resulting from the oxidation of a supplied fuel. As schematically depicted, for example, in FIG. 1, a typical prior art fuel cell consists of an anode (e.g., 'fuel electrode') 130 that provides a reaction site to generate electrons and a cathode (e.g., 'oxidant electrode') 135 to reduce spent fuel ions in order to produce a voltage drop across, for example, an external circuit. The electrodes 130, 135 are generally tonically porous electronic conductors that include catalytic properties to provide significant redox reaction rates. At the anode 130, incident hydrogen-containing fuel 162 (e.g., methanol 185) catalytically ionizes to produce protons 175 (e.g., electron-deficient hydrogen nuclei) and electrons. At the cathode 135, incident oxygen gas 165 catalytically reacts with protons 175 migrating through the electrolyte 140 and electrons from the external circuit to produce water 180 as a byproduct. Depending on various operational parameters of the fuel cell, byproduct water 180 may remain in the electrolyte 140, thereby increasing the volume and diluting the electrolyte 140, or may be discharged from the cathode 135 as vapor 178.

The anode 130 and cathode 135 are generally separated by an ion-conducting electrolytic medium 140 (i.e., PEM's or alkali metal hydroxides such as, for example: KOH, NaOH and/or the like). In early fuel cell experiments, hydrogen and oxygen were introduced into separated compartments while the electrodes where conductively coupled by an external circuit to power a load where electrical work could be accomplished. In the external circuit, electric current is generally transported by the flow of electrons, whereas in the electrolyte 140, current is generally transported by the flow of ions. In theory, any chemical substance capable of oxidation (i.e., hydrogen, methanol, ammonia, hydrazine, simple hydrocarbons, etc.) which may be supplied substantially continuously may be used as galvanically oxidizable fuel at the anode. Similarly, the oxidant (i.e., oxygen, ambient air, etc.) may be selected to be any substance that can oxidize spent fuel ions at a sufficient rate to maintain a suitable voltage drop across the circuit.

The free energy of reaction $\Delta G$ of a fuel cell is given as $\Delta G = \Delta E + \Delta H$, where $\Delta E$ is the energy available to accomplish electrical work and $\Delta H$ is the energy liberated from the reaction to raise the temperature of the fuel cell and the surroundings. In typical fuel cell applications, the heat liberated to the fuel cell's surroundings is much less than the energy available to accomplish electrical work; which may be expressed as: $\Delta H \square \Delta E$.

For example, where $$Q_{FuelCell} = \frac{E_{Electrical}}{E_{Chemical}}$$

represents the efficiency of converting chemical potential energy $E_{Chemical}$ directly to electrical energy $E_{Electrical}$, typical hydrogen/oxygen fuel cell efficiencies on the order of $Q_{FuelCell}=0.65$ to about $Q_{FuelCell}=0.80$ have been observed. These values are nearly twice those of indirect heat-exchange power conversion methods, which may be expressed by the following relation:

$$Q_{FuelCell} \approx 2 Q_{HeatExchange}$$

where the heat-exchange efficiency is given as $$Q_{HeatExchange} = \frac{E_{Combustion}}{E_{Chemical}} \times \frac{E_{Electrical}}{E_{Combustion}}$$

The factor $$\frac{E_{Combustion}}{E_{Chemical}}$$

represents the component efficiency of converting chemical potential energy into heat (i.e., the combustion of fossil fuels) and the factor $$\frac{E_{Electrical}}{E_{Combustion}}$$

represents the component efficiency of converting heat into electrical energy; for example, steam-driven turbo-electric power.

Accordingly, fuel cell operation is intrinsically more efficient than methods employing heat-exchange power conversion. Moreover, other representative benefits of fuel cells include higher energy densities, quiet operation and the lack of recharging and/or electrode replacement requirements.

Standard batteries have generally dominated the currently available choices for portable power storage solutions for consumer-level electronic equipment.

Some of the disadvantages associated with standard batteries, however, are that they generally provide power for a relatively short duration of time and thereafter require recharging or replacement. Fuel cells, on the other hand, have many of the consumer-oriented features typically associated with standard batteries (i.e., providing quiet power in a convenient and portable package) in addition to other representative advantages including, for example, long usage lifetimes and the ability to be fueled with liquid or gaseous compounds rather than 'solid fuels' in contrast to conventional batteries.

One class of fuel cells currently under development for consumer use is the hydrogen fuel cell, wherein hydrogen-rich fuels (i.e., hydrogen, methanol 162, methane, etc.) are used to fuel the redox reaction. As fuel is oxidized at the anode 130, protons 175 pass through the cell for reduction at the cathode 135. In the case of using aqueous methanol 162 as the fuel for example, carbon dioxide 168 is formed as a byproduct at the anode 130. Free electrons from the external circuit then affect reduction of oxygen 165 at the cathode 135. The reduced oxygen 165 then combines with protons to produce water 178. Conventional fuel cell devices may also include charge collectors 190, 195 for effective delivery of electric current to, for example, an external circuit.

One process for fueling a hydrogen cell comprises that of 'direct oxidation' methods. Direct oxidation fuel cells generally include fuel cells in which an organic fuel is fed to the anode for oxidation without significant pre-conditioning or modification of the fuel. This is generally not the case with 'indirect oxidation' (e.g., "reformer") fuel cells, wherein the organic fuel is generally catalytically reformed or processed into organic-free hydrogen for subsequent oxidation. Since direct oxidation fuel cells do not generally require fuel processing, direct oxidation provides substantial size and weight advantages over indirect oxidation methods. Exemplary prior art for direct and indirect fuel cells has been previously disclosed and may be compared, for example, in U.S. Pat. Nos. 3,013,908; 3,113,049; 4,262,063; 4,407,905; 4,390,603; 4,612,261; 4,478,917; 4,537,840; 4,562,123; 4,629,664 and 5,599,638.

Another well-known type of fuel cell component is known as a 'membrane-electrode assembly' (MEA), as described for example in U.S. Pat. No. 5,272,017 issuing on Dec. 21, 1993 to Swathirajan. One exemplary embodiment of such an MEA component includes a DMFC as generally depicted, for example, in FIG. 2. The illustrated DMFC MEA comprises a thin, proton-transmissive, solid polymer-membrane electrolyte 200 having an anode 210*a* on one of its faces and a cathode 210*b* on an opposing face. The DMFC MEA anode 210a, electrolyte 200 and cathode 201b may also be sandwiched between a pair of chemically permeable elements 220a, 220b. This assembly may be further sandwiched between a pair of collector elements 230a, 230b which serve as current collectors for the anode 210a and cathode 210b respectively and contain appropriate channels and/or openings 235a, 235a for the distribution of fuel (i.e., aqueous methanol—in the case of a DMFC device) and oxidant reactants (i.e., oxygen) over the surfaces of the corresponding electrode catalysts. In practice, a number of these unit fuel cells may be stacked or grouped together to form a 'fuel cell stack'. The individual cells may be electrically connected in series by abutting the anode current collector of one cell with the cathode current collector of a neighboring unit cell in the stack.

As the DMFC anode is fueled with a mixture of methanol and water, the oxidation reaction generally proceeds in what is believed to comprise three steps: (1) methanol oxidizes to methanal (e.g., formaldehyde), releasing two electrons; (2) methanal oxidizes to methanoic acid (e.g., formic acid), releasing two electrons; and (3) methanoic acid oxidizes to carbon dioxide, releasing another two electrons. In various embodiments of exemplary DMFC's, the oxidation reaction may be started at any point in the multi-step series since the two intermediates (methanal and methanoic acid) are generally readily obtainable. The first oxidative step (methanol to methanal) is generally regarded as the rate-determining step of the overall reaction given spectroscopic studies indicating that methanal and methanoic acid appear in relatively low concentrations. This would suggest that these intermediates are rapidly oxidized and accordingly, the reaction steps corresponding to their oxidative consumption would be expected to have larger kinetic rate constants. The net anode reaction for a direct methanol-fueled device is therefore typically given as:

$$CH_3OH + H_2O \rightarrow 6H^+ + 6e^- + CO_2$$

Generally, the current produced by a DMFC is proportional to the net reaction rate, wherein one ampere corresponds to approximately 1.04E18 reactions per second. As aqueous methanol is oxidized at the anode, electrons are liberated to flow through an external circuit to power a load where electrical work may be accomplished. Protons migrate through the proton-transmissive electrolytic membrane where they subsequently are combined with oxygen that has been reduced with incoming electrons from the external circuit with water formed as a result.

Diffusive Transport—A Qualitative Description

Given a thin barrier of infinite permeability and cross-sectional area A that extends from x to x+l (where l represents the thickness of the barrier), the volume of the barrier may be expressed as V=Al. Let the concentration at point x of particles G be [G] at time t. Accordingly, the number of particles that enter the barrier per unit time is JA where J is the particle flux. Therefore, the rate of increase in molar concentration inside the barrier due to the incoming particle flux is

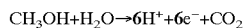

$$\left.\frac{\partial [G]}{\partial t}\right|_x = \frac{JA}{Al} = \frac{J}{l}.$$

Consider also an out-bound flux of particles at the x+l surface of the barrier which may be similarly derived as $$\left.\frac{\partial [G]}{\partial t}\right|_{x+l} = \frac{J'A}{Al} = \frac{J'}{l}.$$

Therefore, the net time rated change of concentration (e.g., the 'concentration velocity') may be expressed as:

$$\frac{d[G]}{dt} = \frac{J - J'}{l}$$

Suppose: (1) that the flux of particles J diffusing inside the barrier comprises motion in response to a thermodynamic force F arising from a concentration gradient; (2) that the particles reach a steady-state drift speed s when the thermodynamic force F is matched by the viscous drag; (3) that the drift speed s is proportional to the thermodynamic force F; (4) that the particle flux J is proportional to the drift speed; and (5) that the thermodynamic force F is proportional to the spatial concentration gradient $$\frac{d[G]}{dx}.$$

The resulting chain of proportionalities $J \propto s$, $s \propto F$, and $$F \propto \frac{d[G]}{dx}$$

implies that the particle flux J is proportional to the concentration gradient $$\frac{d[G]}{dx},$$

which will be apparent to skilled artisans as corresponding to 'Fick's First Law of Diffusion'. The constant of proportionality is given as the diffusion coefficient D in the equation $$J = D\frac{d[G]}{dx}$$

for diffusion restricted to a single dimension x. Therefore, the expression J-J' taken from the expression for the diffusive concentration velocity becomes $$D\frac{d[G]'}{dx} - D\frac{d[G]}{dx}.$$

Substitution of the linear accumulation of particle concentration over the thickness of the membrane yields $$J - J' = D\frac{d}{dx}\left([G] + D\frac{d[G]}{dx}l\right) - D\frac{d[G]}{dx}$$

which further reduces to $$J - J' = Dl\frac{d^2[G]}{dx^2}.$$

This expression may then be substituted back into the concentration velocity expression to yield:

$$\frac{d[G]}{dt} = \frac{J - J'}{l} = D\frac{d^2[G]}{dx^2} = D\nabla_x^2[G],$$

which will be apparent to skilled artisans as the time dependent diffusion equation according to 'Fick's Second Law of Diffusion' and relates the concentration velocity at any point to the spatial variation of the concentration at that point. More generally, this may be appreciated as a physical basis for the typically observed behavior of diffusing chemical species translating away from areas of relative high concentration to areas of relative lower concentration (e.g., "moving down the concentration gradient").

Next, consider the time dependence of the partial molecular pressure p of effusing particles G from a container of given volume V. The 'Ideal Gas Law' PV=nRT, which for molecular-scale systems rather than for large aggregates of particles (i.e., moles of molecules), becomes pV=nkT wherein:

p is the partial molecular pressure;
V is the volume of the container providing spatial boundary conditions;
n is the number of particles;
k is the Boltzmann constant; and
T is the temperature.

Solving for the partial pressure yields $$p = \frac{nkT}{V}.$$

After taking the partial derivative with respect to time at constant temperature and volume, the following expression for the pressure velocity may be obtained:

$$\left.\frac{\partial p}{\partial t}\right)_{T,V} = \frac{\partial\left(\frac{nkT}{V}\right)}{\partial t} = \frac{kT}{V}\frac{\partial n}{\partial t}.$$

For effusing particles that are not replenished over time as the particles escape, the time-rated change of the number of particles is given as $$\frac{\partial n}{\partial t} = -Z_w A_o,$$

where $Z_w$ is the collisional frequency associated with the mean free path of the particles and $A_o$ is the area of the opening that the effused particles have available to escape from. The collisional frequency is related to the partial pressure of the particles p, the mass of the particles m and the temperature of the system T by the equation $$Z_w = \frac{p}{\sqrt{2\pi mkT}}.$$

Substitution of this relation back into the expression for the pressure velocity yields $$\frac{\partial p}{\partial t} = \frac{-pA_0}{V}\sqrt{\frac{kT}{2\pi m}}$$

which integrates over time to $$p = p_0 e^{\frac{-t}{\tau}},$$

where $$\tau = \frac{V}{A_0}\sqrt{\frac{2\pi m}{kt}}.$$

From this expression for the effusive pressure velocity, the following may generally be observed: (1) if the particle matter is not replenished, the pressure decreases exponentially to zero; (2) the pressure velocity is faster with increasing temperature and slower with decreasing temperature; (3) the pressure velocity is slower with heavier particles and faster with less massive particles; (4) the pressure velocity is faster with increasing surface area of the effusive opening(s) and slower with decreased surface area; and (5) the pressure velocity is slower, with increasing volume of the effusive container and faster with increasing volume.

At constant temperature, the time derivative of the expression for the partial pressure $$p = \frac{nkT}{V}$$

becomes:

$$\left.\frac{\partial p}{\partial t}\right)_T = kT\frac{\partial\left(\frac{n}{V}\right)}{\partial t} = kT\frac{\partial[G]}{\partial t}.$$

Therefore, substituting the expression corresponding to Fick's Second Law of Diffusion for the concentration velocity previously derived, the generalized expression for the pressure velocity of particles diffusing in three dimensions in a barrier of infinite permeability as a function of concentration of the particles [G] may be represented as:

$$\left.\frac{dp}{dt}\right)_T = -kTD_C\nabla^2[G] = -kTD_G\left(\frac{\partial^2}{\partial x^2} + \frac{\partial^2}{\partial y^2} + \frac{\partial^2}{\partial z^2}\right)[G].$$

If, however, the barrier is assumed to have finite diffusive permeability, an additional diffusion coefficient $D_{\Psi(a,b,c)}$ may be included to account for various barrier-dependent permeability metrics such as, for example: non-uniform porosity; anisotropic transport along different dimensions; hydrophobicity; hydrophilicity; barrier/membrane/capillary defects; etc.

As enabling disclosure for a representative embodiment directed to an exemplary DMFC system in accordance with one aspect of the present invention is developed, it may be convenient to consider the following qualitative expression for protons diffusing through a membrane (or otherwise porous barrier) $\Psi$:

$$\left.\frac{dp}{dt}\right)_{\Psi,H^+}^{diffusion} = -kT(\hat{D}_{\Psi(a,b,c)}D_{H^+})\left(\frac{\partial^2}{\partial x^2} + \frac{\partial^2}{\partial y^2} + \frac{\partial^2}{\partial z^2}\right)[H^+]$$

Upon inspection, this expression relates the protonic concentration at any point within a membrane (or otherwise porous barrier) $\Psi$ to the three-dimensional variation of proton concentration at that point; which is to say that protons will diffuse through a porous barrier so as to move down the protonic concentration gradient from volume elements comprising higher proton concentrations to volume elements comprising relative lower proton concentrations.

Substitution of $A_\Psi l$ for the volume V in the effusion equation $$\frac{dp}{dt} = \frac{-pA_0}{V}\sqrt{\frac{kT}{2\pi m}} \quad \text{yields} \quad \frac{dp}{dt} = \frac{-pA_0}{A_\Psi l}\sqrt{\frac{kT}{2\pi m}}.$$

If the ratio of the area of the membrane openings to the aggregate surface area of the membrane normal to the effusing particle transport path is taken to be a dimensionless quantity $\theta$ corresponding to the porosity of the membrane at the surface of effusion, a composite expression for protons effusing from a membrane (or otherwise porous barrier) surface becomes:

$$\left.\frac{dp}{dt}\right)_{\Psi,H^+}^{effusion} = -p_{H^+}\theta_\Psi\sqrt{\frac{kT}{2\pi m_{H^+}l_\Psi^2}}$$

and relates the vapor pressure of protons that diffuse through the barrier to reach the exterior surface of the porous barrier $\Psi$ to: the back-side pressure of protons $p_{H+}$; the temperature T; the mass of the protons $m_{H+}$; the thickness of the barrier l; and the porosity of the barrier $\theta_\Psi$. Accordingly, protons will generally be observed to: (1) effuse more rapidly at higher operating temperatures and more slowly at lower temperatures; (2) effuse more rapidly with increased back-side pressure of protons and more slowly with decreased back-side pressure; (3) effuse more rapidly with membranes having increased porosity and more slowly with decreased porosity; and (4) effuse more rapidly with porous barriers having decreased linear transport distances (e.g., thinner membranes) and more slowly with increased transport distances.

Polymer Electrolyte Membranes

Although ion-containing polymers have been around for some time, the past fifteen years have witnessed much interest in the literature. Most of the research effort on these ionomers have generally been devoted to a relatively small number of materials—notably: ethylenes, styrenes, rubbers, and those based on, for example, poly-tetrafluoroethylene. See, for example, Butler, G. B. et al., *JMS-Rev. Macromol. Chem. Phys.* C34(3), 325–373 (1994). NAFION® (available from DuPont Microcircuit Materials, E. I. Du Pont de Nemours and Company, 14 T. W. Alexander Drive, Research Triangle Park, N.C., USA) is one such example of a poly-tetrafluoroethylene-based ionomer. From its development in the 1960's, NAFION has found applications in liquid and gas separations, fuel cells as well as in the chlor-alkali industry. The diversity of applications for NAFION may be due in no small part to its thermal stability, chemical resistance, ion-exchange properties, selectivity, mechanical strength and insolubility in water. NAFION's ability to form or otherwise provide wide, well-separated, highly-branched channels with good channel connectivity and relatively small $SO_3^-/SO_3^-$ separation, in addition to a $pK_a \sim -6$, generally recommends itself to integration with a variety of fuel cell applications.

NAFION is a perfluorinated polymer that contains small proportions of sulfonic or carboxylic ionic functional groups. The general polymeric structure of NAFION may be conveniently represented as:

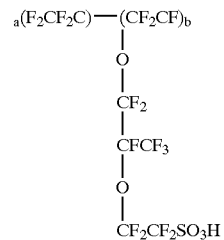

In terms of macroscopic structure, NAFION is relatively complex. Although the exact structure has not been characterized, several models have been proposed since the early 1970's to describe the way in which ionic groups aggregate within the NAFION polymer. These models generally include: The Mauritz-Hopfinger Model, The Yeager Three-Phase Model, The Eisenberg Model of Hydrocarbon Ionomers, and The Gierke Cluster Network Model. See, for example, Robertson, M. A. F., Ph.D. Thesis, University of Calgary (1994). A common objective of these models is to predict the fundamental feature of unique equilibrium ionic selectivities as well as the ionic transport properties of perfluorinated ionomer membranes. Ibid.

As a result of electrostatic interactions, these ionic groups tend to aggregate to form tightly packed regions referred to as clusters. The presence of these electrostatic interactions between the ions and the ion pairs generally enhances the intermolecular forces, thereby exerting a significant effect on the properties of the parent polymer.

The Yeager Three Phase Model is a phenomenological model based on a three-phase clustered system with interconnecting channels within the polymer. The three regions consist of a fluorocarbon backbone (some of which is microcrystalline), an interfacial region of relatively large fractional void volume (containing some pendant sidechains, some water, and sulfate or carboxylic groups and counter ions which are generally not in clusters), and the clustered regions where the majority of the ionic exchange sites, counter ions, and sorbed water exists. See, for example, Brookman, P. J.; Nicholson, J. W. in: *Developments in Ionic Polymers,* vol. 2, 269–283, Elsevier Applied Science Publishers: London (1986).

From experimental means, such as for example, small-angle x-ray scattering (SAXS), it has been observed that the phase-separated morphology is on the order of about 40–50 Å Bragg spacing; however, upon hydration, NAFION can increase its dry weight by as much as 50 percent or more depending upon equivalent weight, counter ion and temperature. Upon hydration, however, cluster diameter and the number of exchange sites are thought to increase, leading to fewer, larger clusters. Ibid.

NAFION, with its existing ionic clusters and postulated inter-cluster channels, serves not only as a stable platform or template, but also as a catalyst. The sulfonate exchange sites in the ionomer are quite acidic. Therefore, the clusters in NAFION generally serve as reaction vessels in which future polymerizations may occur without the addition of an external catalyst. The pre-existing morphology of NAFION, as discussed vide supra, has a direct influence on the in situ morphology of any inorganic phase in view of the fact that the clusters are only on the order of about 40–50 Å in size. Therefore, one can generate distinct ordered structures in the clusters and form a network between clusters using the short channels that connect the aggregates. Upon doing so, the original ionomer properties may be altered and tailored to specific uses and needs, such as for example, specific gas and liquid separations and/or fuel cell applications.

Other ionomeric materials that may find improved derivatization in accordance with various exemplary embodiments of the instant invention include:

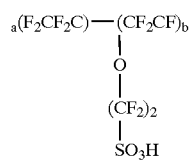

Dow Membrane;

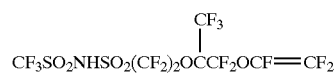

Sulfonyl Imide Monomer; and

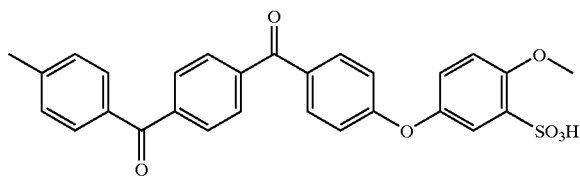

PEEKK.

PEEKK is a sulfonated polyether ketone capable of forming or otherwise providing narrower, less-separated channels with somewhat larger $SO_3^-/SO_3^-$ separation as compared with NAFION. Additionally, PEEKK has a much lower $pK_a$ on the order of about −1.

Distinctly different efforts into the design of advanced and cost-effective membranes include: (1) aromatic backbone polymers, i.e. polyether ketones (PEEKK, PEEK, etc.); (2) the inclusion of small inorganic particles like silica, or zirconium phosphates and sulfophenylphosphates within the membrane; (3) acid/base blending or covalent cross-linking of polymers; and (4) the complexation of basic polymers (i.e., polybenzimidazole) with oxo-acids (i.e., phosphoric acid). The PEEKK membranes offer definite cost and stability advantages over Nafion membranes, but exhibit substantially lower conductivity at the lower water concentrations. The membranes in (2) and (3) exhibit increased thermal stability (up to 140° C.) and reduced swelling and methanol and water crossover, but at a penalty in terms of conductivity and mechanical stability. Finally, the membranes with immobilized acid generally demonstrate conductivities as high as those seen in the hydrated systems but with substantially reduced methanol crossover.

Although there has been substantial work in the synthesis and testing of various membranes, many performance features are not well understood. Equally deficient is a fundamental, molecular-based understanding of the mechanisms of proton and water transport as a function of membrane morphology and hydration. Clearly, success in the design of novel membranes possessing many of the characteristics required for use in a commercial fuel cell will require the fundamental physical and mechanistic insight generated from molecular modeling studies.

The hydrated morphology of the sulfonic acid based ionomers has a direct bearing on the transport of protons and water in the membrane. The perfluoro polymers combine relatively high hydrophobicity of the polytetrafluoroethylene (PTFE) backbone with the relatively high hydrophilicity of the sulfonic acid functional groups in a single macromolecule. In the presence of water a two-phase system forms consisting of a network of water containing clusters or pores surrounded by, for example, the PTFE medium. The latter typically provides the structural and thermal stability of the membrane and is also responsible for the immobilization of the dissociated sulfonic acid groups ($-SO_3^-$); hence, referred to as "fixed sites". It is within the hydrophilic domains that the transport of water and protons typically occurs. An interfacial region, therefore, exists consisting of solvated sulfonate-terminated perfluoroether sidechains. This interface separates a water region in the central portion of the pore that is 'bulk-like', from the PTFE backbones. The nature and character of the water in the pores, however, was previously not well understood in the prior art.

In the modeling work of Eikerling et al. the mobility of the protons was thought to occur via two mechanisms: a surface mechanism where proton transport proceeds along the array of acid groups (i.e., via structure diffusion) along the interface and a bulk mechanism where the protons are transported with the Grotthuss mechanism. See, for example, M. Eikerling et al., *J. Phys. Chem. B,* 105, 3646 (2001). In addition, Eikerling attempted to model membrane morphological aspects including connectivity of the hydrophilic domains, orientation of the pores in the network and evolution of the pore volume with water uptake.

The hydrated morphologies and consequent function of polyether ketone membranes is somewhat different from the perfluoro polymers. Small angle X-ray scattering (SAXS) experiments suggest that there is a less pronounced separation of the hydrophobic and hydrophilic domains than observed in NAFION membranes. This along with the greater rigidity of the aromatic backbone of the polymer result in narrower water filled pores. In addition, results from pulsed-field gradient NMR measurements indicated that the electro-osmotic drag and water permeation is lower in the PEEKK membranes.

Although previous experimental investigations provide a qualitative understanding of the function of the sulfonic acid based ionomers (perfluoro and aromatic), the specific details of how the molecular structure and hydrated morphologies connect with the transport of protons and water through the membranes was not characterized. The development of novel materials for application in fuel cells will generally require a fundamental understanding of the function of existing materials. Thus, in one exemplary and representative aspect, the present invention provides inter alia a modeling system and method for characterizing the hydration and acid dissociation in these classes of ionomers with the aim of connecting fundamental studies with the function of hydrated membranes.

With any ionomer, it may well be currently impossible to treat the entire polymer in an ab initio manner (i.e., a full electron treatment with molecular orbital theory). Treatment of the polymer with empirical or even semi-empirical methods, while computationally feasible, will generally yield conformational results for the polymer interacting with water that are largely incorrect due to the approximations employed for the force fields. Accordingly, for any ionomer modeled in accordance with the method described herein, the smallest monomeric sub-unit of the polymer that contains the essential, membrane specific molecular components may be considered. For NAFION, this sub-unit may be taken to be trifluoromethane sulfonic acid (triflic acid) and for the PEEKK membranes, para-toluene sulfonic acid for the characterization of, for example, proton dissociation. In terms of characterization of properties of the sidechain, the monomeric unit generally depicted in FIG. 3 may be used, for example, to model NAFION. Those skilled in the art will appreciate that various substantially canonical representations of chemical structures and/or sub-structures may be effectively employed to arrive at substantially similar results in accordance with the instant invention and that such representations are considered within the scope and ambit of the present invention.

In the first stage of modeling, the perfluoro and aromatic ionomer electronic structure calculations of the corresponding acid with explicit water molecule solvation are treated. These computations are generally used to determine minimum energy conformations revealing inter alia fundamental characteristics of the acid dissociation and local proton transport dynamics. In addition they also reveal information concerning the shielding or screening afforded by water molecules of, for example, the first hydration shell.

Molecular information may thereafter be obtained that, when combined with experimental studies of the hydrated morphology of the polymer, generally provide a set of parameters for implementation in a water and proton transport model. This is given as the second stage of the modeling protocol and is generally based on the computation of, for example, the proton friction and diffusion coefficients within a PEM pore using a non-equilibrium statistical mechanical framework. An algorithm of this model is presented vide supra. Together, the molecular structure and transport modeling methods provide the means for connecting the molecular scale information of the polymer with the macroscopic (and therefore experimentally measurable) transport properties of the membrane. Of substantial significance to how the prior art has been improved by the instant invention is the fact that bridging of the different length and time scales may be accomplished without resorting to any 'fitting' or adjustable parameters—indicating inter alia the improved predictive capability of the system and method described herein.

Modeling and Computational Methods

Electronic Structure Calculations

All ab initio self-consistent-field (SCF) molecular orbital calculations were performed using the G98 suite of programs (Gaussian98, revision A.9; available from Gaussian Inc., Pittsburgh, Pa., USA). Full geometry optimizations, using conjugated gradient methods to accelerate convergence (see, for example, H. B. Schlegel, J. Comp. Chem. 3, 214 (1982)) were undertaken on the acids (i.e., $CF_3SO_3H$ and $CH_3C_6H_4SO_3H$) without symmetry constraints using Hartree-Fock theory with the 6-31G(d,p) split valence basis set. See, for example, P. C. Hariharan, J. A. Pople, Theo. Chim. Acta. 28, 213 (1973). The HF/6-31G(d,p) minimum energy conformations were then refined with density functional theory with Becke's 3 parameter functional (B3LYP) with the same basis set. See, for example, A. D. Becke, J. Chem. Phys. 98, 5648 (1993). Water molecules were then systematically added to the B3LYP/6-31G(d,p) minimum energy structure to obtain successively larger solvation clusters of the acid (i.e., $SO_3H+nH2O$; $1 \leq n \leq 6$); and the same discrete optimization protocol conducted. Electrostatic potential derived atom centered partial charges were obtained for the B3LYP/6-31G(d,p) minimum energy clusters according to the ChelpG scheme. See, for example, C. M. Breneman, K. B. Wiberg, J. Comp. Chem. 11, 361 (1990).

Proton Transport Model

Mathematical details of our model in the form of a derivation from first principles were present earlier. See, for example, S. J. Paddison et al., "Proton Conducting Membrane Fuel Cells II", Electrochemical Soc. Proc. Series, Pennington, N.J. 98–27, 106 (1999); S. J. Paddison et al., J. Electrochem. Soc. 147, 617 (2000); and S. J. Paddison et al., J. Chem. Phys. 115, 7753 (2001). In general, the molecular structure of the hydrated polymer is connected with the macroscopic (e.g., measurable) quantity of the proton diffusion coefficient. Factors affecting the coupled transport of a proton and a water molecule (i.e., a hydronium ion, designated subscript $\alpha$ in the expressions vide infra) are examined in a hydrated pore/channel of a PEM ex situ of a fuel cell configuration.

The Einstein relation $$D_\alpha = \frac{kT}{\zeta_\alpha}$$

generally establishes the inverse relationship of the diffusion coefficient with the friction coefficient. While the Stokes relation $\zeta=6\pi\eta a$ is commonly used to compute friction coefficients for macroscopic objects moving in, for example, viscous media (which in combination with the Einstein relation produces the Stokes-Einstein formula). In one embodiment of the present invention, a method of non-equilibrium statistical mechanics is employed to compute the average force experienced by, for example, a hydronium ion moving in the pore of an ionomeric PEM material, making use of the fundamental definition of the friction coefficient $\langle F_\alpha \rangle = -\zeta \cdot v_\alpha$, where $v_\alpha$ is the velocity (assumed to be constant) of the hydronium ion. Accordingly, via computation of the average force, the diffusion coefficient may be evaluated.

The pore of the ionomeric PEM material is assumed to possess a cylindrical geometry with length L and cross sectional radius R, filled with N water molecules each possessing a dipole moment $\mu$. The dissociated sulfonic acid functional groups ($-SO_3^-$) in the pore are modeled as n radially symmetric, axially periodic arrays of fixed ions (i.e., point charges) each possessing a charge of $e^-$. In accordance with one exemplary embodiment of the present invention, the average force experienced by a hydronium ion in such a pore may be calculated from the statistical mechanical relation:

$$\langle F_\alpha \rangle (r_\alpha) = \int F_\alpha(r_\alpha, r) \rho(r_\alpha, p, r) dr \, dp$$

where $r_\alpha$ denotes the position of the hydronium ion and the average (e.g., integration) is over the position r and conjugate momentum p of all N water molecules of the net force on the hydronium weighted with a phase space distribution function corresponding to $\rho(r_\alpha, p, r)$. This distribution function may be generally obtained from the more generic time-dependent distribution function; a solution of the time evolution or Liouville equation:

$$i \frac{\partial \rho(r_\alpha, p, r, t)}{\partial t} = L_o \rho(r_\alpha, p, r, t)$$

where $L_o$ is the Liouville operator for the pore system in accordance with a representative aspect of the present invention with a coordinate reference system moving with constant velocity $v_\alpha$. The Liouville operator may be defined by the Poisson bracket $L_o = i\{H_o(r_\alpha, p, r)\}$, where $H_o(r_\alpha, p, r)$ corresponds to the Hamiltonian for the pore. The total energy of the pore will generally consist of the kinetic energy of all the water molecules and the net potential energy $V(r_\alpha, r)$ due to two-body interactions of the water molecules, hydronium ion, and fixed sites according to, for example:

$$H_o(r_\alpha, p, r) = \sum_{i=1}^{N} \frac{m(v_i + v_\alpha)^2}{2} + V(r_\alpha, r)$$

where m is the mass and $v_i$ is the velocity of the $i^{th}$ water molecule. The latter term here comprising, for example, the following four contributions:

$$V(r_\alpha, r) = -\sum_{i=1}^{N} \frac{\mu^2 e^2}{48\pi^2 \varepsilon^2 kT} \frac{1}{|r_\alpha - r_i|^4} + \Psi_o \cos\left(\frac{2\pi n z_\alpha}{L}\right) + \sum_{i<j}^{N} \frac{2\mu^4}{3(4\pi\varepsilon)^2 kT} \frac{1}{|r_i - r_j|^6} - \sum_{i=1}^{N} \frac{2\pi\mu\Psi_o n}{eL} \sin\left(\frac{2\pi n z_i}{L}\right)$$

where $\varepsilon$ is the permittivity of the water in the pore, k the Boltzmann constant, T the temperature and $\Psi_o$ the amplitude of the potential energy due to interaction of the hydronium ion with the $-SO_3$ groups. These respective contributions to the potential energy of the system are due inter alia to: (1) interactions of the hydronium ion with the water molecules; (2) interaction of the hydronium ion with the arrays of the fixed sites; (3) water-water interactions; and (4) interactions of the water molecules with the fixed sites. Accordingly, a formal solution of the Louiville equation may be expressed as:

$$\rho(r_\alpha, p, r, t) = e^{-iL_o t} \rho(r_\alpha, p, r, 0)$$
$$= e^{-iL_o t} \rho_{eq}(r_\alpha, p, r)$$

where $\rho_{eq}(r_\alpha, p, r)$ may be understood as the distribution function under equilibrium conditions. A non-equilibrium stationary state (i.e., in the moving ion frame of reference) and described by the distribution function in accordance with the average force equation may be obtained in the limit of $t \to \infty$ in the expression for the formal solution of the Louiville equation vide supra. The total force required may be determined, for example, by taking the action of the Louiville operator on the momentum of the hydronium ion. Combining these results, one may obtain an expression for the scalar friction coefficient of the hydronium comprising at least four force-force correlation functions:

$$\zeta_\alpha = \frac{\beta}{3} \int_0^\infty \left( \langle F_{\alpha s} e^{-iL_o t} F_{\alpha s} \rangle_0 + \langle F_{\alpha s} e^{-iL_o t} F_{ps} \rangle_0 + \langle F_{\alpha p} e^{-iL_o t} F_{ps} \rangle_0 + \langle F_{\alpha p} e^{-iL_o t} F_{\alpha s} \rangle_0 \right) dt$$

where $$\beta = \frac{1}{kT}$$

and the forces $F_{\alpha s}$, $F_{ps}$ and $F_{\alpha p}$ are generally experienced between: (1) the hydronium ion and the water molecules; (2) the fixed sites and the water molecules; and (3) the hydronium ion and the fixed sites, respectively. In an exemplary and representative embodiment of the present invention, the later three terms are explicitly evaluated, taking their sum to be a correction $\zeta^{(c)}$ to the friction coefficient of the proton in bulk water; for example:

$$\zeta^{(c)} = \zeta_2 + \zeta_3 + \zeta_4$$

Examination of the first force-force correlation function $\zeta_1$ indicates involvement of the force the water exerts on the hydronium ion $F_{\alpha s}$, and so may be taken to correspond to either the friction coefficient of a hydronium ion in bulk water calculated with the Stokes relation or the friction coefficient of a proton in bulk water derived from experimental diffusion measurements. The choice of the numerical value of $\zeta_2$ may depend on the characteristics of water (i.e., in the pore) through which the proton moves and is discussed further vide infra.

Representative Results

As indicated vide supra (for example, from B3LYP/6-31G minimum energy calculations for the monomeric acids) a single water molecule was brought in proximity to the sulfonic acid portion of the ionomeric molecule of interest with optimizations performed; first at the HF/6-31G level and then at the B3LYP/6-31G** level of theory.

Successive water molecules were then individually added without any bias or constraints as to the starting geometry prior to the optimization.

Minimum energy conformations (B3LYP/6-31G**) for triflic acid with the successive addition of six water molecules were also calculated. Structural parameters comprising, for example, the —OH distance (e.g., oxygen of the sulfonic acid / sulfonate group to the acidic hydrogen) and the O . . . H . . . $OH_2$ distance (e.g., the distance from the oxygen on the sulfonic acid/sulfonate group to the oxygen of the water molecule/hydronium ion) are generally provided in Table 1 vide infra. It is of some interest to note that despite the fact that $CF_3SO_3H$ is generally regarded as a 'superacid', no substantial dissociation of the proton occurs with either the addition of the first water molecule or even after a second water molecule is added. The $CF_3SO_3H+H_2O$ conformation generally demonstrates that the water molecule forms a somewhat shorter (as compared to the typical ~2.8 Å) hydrogen bond with the acidic proton and adopts an overall 'six-membered ring' conformation with the $SO_3H$ group. Table 1 demonstrates that the $SO_3$—H bond distance has increased by about 0.086 Å after the second water molecule has been added over that observed in the minimum energy conformation of, for example, $CF_3SO_3H$ (0.973 Å). However, no dissociation of the proton is observed even after a second water molecule is added.

After a third water molecule is added, a substantially spontaneous dissociation of the acidic proton may be observed during the B3LYP/6-31G** optimization. The formation of a hydronium ion is favored through inter alia the formation of hydrogen bonds with the two water molecules and one of the oxygens of the newly-formed triflate anion. The dissociated state is generally adopted as a result of, for example, the excess positive charge stabilized in the hydrogen bonding network and the excess electron density due to the breaking of the $SO_3$—H bond which is sufficiently delocalized by the electron withdrawing —$CF_3$ group. The combination of these two effects generally results in a minimum energy conformation for the cluster having a dissociated proton. The separation, as measured by the distance of the oxygen on the hydronium ion to the sulfonate oxygen from which the proton left, is on the order of magnitude of approximately the mean of that observed by experiment.

The clusters formed with four and five water molecules are similar to that observed with three water molecules in that the hydronium ion generally forms a contact ion pair with the triflate anion. However, the hydronium ion typically adopts a position further away from the anion as the number of water molecules is increase from 3 to 5. See, for example, Table 1.

Finally, with the addition of the sixth water molecule, a substantially complete separation of the excess proton (e.g., hydronium ion) from the anion may be observed. This result was consistently demonstrated with optimizations started from several different initial geometries. Here, the hydronium ion forms an Eigen ion as it is hydrogen bonded to three water molecules with an average O—O distance of 2.56 Å. Of further significance is the observation that the hydronium ion is nearly twice the distance away from the anion (4.243 Å) as was observed in the contact ion pair minimum energy conformations (2.556 Å–2.693 Å). This suggests that with sufficient water (i.e., with 6 $H_2O$'s) the proton is shielded from direct electrostatic interaction with the sulfonate anion. Clearly, in the context of the hydrophilic terminations of a NAFION polymer, this observation will be considered to have significant effects on the conductivity of the membrane. This result also suggests that the 'first' hydration shell of the triflate anion is made up of five water molecules.

Optimized structures (at the B3LYP/6-31G** level) for para-toluene sulfonic acid with the successive addition of one through six water molecules were also calculated. In comparing these minimum energy conformations with those obtained from triflic acid, a number of qualitative similarities may be observed: (1) the conformation with a single water molecule adopts the same 'six-membered ring' structure with the $SO_3H$ group; (2) upon the addition of the third water molecule, the proton spontaneously dissociates from the acid forming a hydronium ion; and (3) separation of the hydronium ion from the sulfonate anion does not occur until six water molecules are added. There are, however, important quantitative differences in the structural parameters of the various water clusters.

A similar set of structural parameters was tabulated for para-toluene sulfonic acid as generally given in Table 1. The oxygen-hydrogen bond distance in the minimum energy conformation of both acids, without the addition of any water molecules, is essentially the same (0.97 Å). However, after the addition of the first and second water molecules, this bond stretches to a greater extent in triflic acid (compare, for example, columns 2 and 4 in Table 1) than with para-toluene sulfonic acid. Additionally, the water molecule hydrogen bonded to the acidic proton generally adopts a closer position to the sulfonic acid (compare, for example, columns 3 and 5 in Table 1) for the former system. After dissociation of the proton occurs (at n=3), the opposite trend is generally observed. Here, the hydronium ion in the water clusters of the aromatic sulfonic acid generally adopts a position that is closer to the sulfonate anion than that observed in the perfluorinated sulfonic acid. This trend continues with the further addition of water molecules; and after separation of the ions occurs (at n=6), the difference in the separation distances of the two ions is substantially greater with triflic acid. All of these conformational differences may, at least in a 'Lewis acid' sense, be rationalized in terms of the differences in the strength of the acids and conjugate bases.

Triflic acid is generally a substantially stronger acid than para-toluene sulfonic acid. Upon dissociation of the first proton, electron density on the sulfonate anion is generally delocalized in both systems. However, in the aromatic system, electron density is typically delocalized in the π-ring; and in the perfluorinated system it is withdrawn and stabilized by, for example, the —$CF_3$ group. The conjugate Lewis base (i.e., sulfonate anion) that is formed is typically stronger in the case of para-toluene sulfonate anion than for the triflate anion. The strength of the conjugate base has a direct bearing on the position of the dissociated proton; for example, the proton will interact more strongly in the case of the stronger conjugate base, i.e. para-toluene sulfonate. This will be quantified as a function of the number of water molecules in the acid/anion cluster through observation of the computed partial atomic charges.

The atom centered partial charges and dipole moments (as calculated with the ChelpG routine) of the water clusters of $CF_3SO_3H$ and $CH_3C_6H_4SO_3H$ are presented in Tables 2 and 3. Examination of Table 2 shows the substantial positive charge residing on the sulfur atom and the negative charge on the oxygen atoms. The charge on the former decreases significantly after dissociation, while the negative charge on the latter increases upon dissociation of the proton. It is also interesting to note that there remains slightly more negative charge on the oxygen from which the proton resided throughout the addition of the water molecules than on the other two sulfonate oxygens.

TABLE 1

Structural parameters for water clusters of $CF_3SO_3H + n\ H_2O$ and $CH_3C_6H_4SO_3H + n\ H_2O$; (n = 1, 2, 3 ... 6)

| Number of Water Molecules, n | $CF_3SO_3H$ r ($-SO_3H \ldots OH_2$) Å | $CF_3SO_3H$ r ($-SO_3H \ldots OH_2$) Å | $CH_3C_6H_4SO_3H$ r ($-SO_3H \ldots OH_2$) Å | $CH_3C_6H_4SO_3H$ r ($-SO_3H \ldots OH_2$) Å |
|---|---|---|---|---|
| 0 | 0.973 | — | 0.972 | — |
| 1 | 1.020 | 2.595 | 1.007 | 2.650 |
| 2 | 1.059 | 2.496 | 1.033 | 2.564 |
| 3 | 1.562 | 2.556 | 1.437 | 2.488 |
| 4 | 1.721 | 2.658 | 1.455 | 2.500 |
| 5 | 1.739 | 2.693 | 1.433 | 2.487 |
| 6 | 3.679 | 4.243 | 3.196 | 3.645 |

TABLE 2

Atom centered partial charges and dipole moment for $CF_3SO_3H + n\ H_2O$; (n = 1, 2, 3 ... 6)

| Number of Water Molecules, | Atom, $-SO_3H$ | | | | Total charge on oxygen atoms | Dipole Moment |
|---|---|---|---|---|---|---|
| n | S | O† | O | O | | |
| 0 | 0.8436 | −0.4866 | −0.4308 | −0.3794 | −1.2968 | 2.7219 |
| 1 | 0.7950 | −0.5085 | −0.4652 | −0.3889 | −1.3626 | 3.3996 |
| 2 | 0.8460 | −0.5178 | −0.5074 | −0.4106 | −1.4358 | 4.2398 |
| 3 | 0.6484 | −0.5373 | −0.4887 | −0.4879 | −1.5139 | 4.0042 |
| 4 | 0.6185 | −0.5226 | −0.5134 | −0.4881 | −1.5241 | 1.8784 |
| 5 | 0.5812 | −0.5163 | −0.4887 | −0.4533 | −1.4583 | 2.6558 |
| 6 | 0.63.76 | −0.4978 | −0.4703 | −0.4703 | −1.4384 | 4.8486 |

O† = oxygen atom to which acidic proton is/was bonded

TABLE 3

Atom centered partial charges and dipole moment for $CH_3C_6H_4SO_3H + n\ H_2O$; (n = 1, 2, 3 ... 6)

| Number of Water Molecules, | Atom, $-SO_3H$ | | | | Total charge on oxygen atoms | Dipole Moment |
|---|---|---|---|---|---|---|
| n | S | O† | O | O | | |
| 0 | 0.9136 | −0.5482 | −0.4483 | −0.4861 | −1.4826 | 4.8514 |
| 1 | 0.7884 | −0.5636 | −0.4520 | −0.5041 | −1.5197 | 2.6625 |
| 2 | 0.7354 | −0.5803 | −0.4884 | −0.5048 | −1.5735 | 3.4458 |
| 3 | 0.7459 | −0.5947 | −0.5512 | −0.5511 | −1.6970 | 2.0463 |
| 4 | 0.8359 | −0.6048 | −0.5995 | −0.5538 | −1.7581 | 1.0546 |
| 5 | 0.8121 | −0.6108 | −0.5882 | −0.5573 | −1.7563 | 3.1181 |
| 6 | 0.6556 | −0.5493 | −0.5073 | −0.5073 | −1.6018 | 5.6153 |

O† = oxygen atom to which acidic proton is/was bonded

It is interesting to note the similarity in the negative excess charge density lying on the atom centers of the molecule throughout the range of associated water molecules; there is only slightly more negative charge on $CF_3SO_3H/CF_3SO_3^-$ than residing on $CH_3C_6H_4SO_3H/CH_3C_6H_4SO_3^-$. Examination of the total negative charge residing on the sulfonic/sulfonate oxygen atoms (see, for example, the sixth column in Tables 2 and 3) shows differences between the two systems. For example, there is consistently greater negative charge on the oxygens in the aromatic clusters. This demonstrates inter alia the increased basicity of the $CH_3C_6H_4SO_3^-$ anion. The strength of the conjugate Lewis base for either anion, therefore, substantially depends on the position adopted by hydronium ion; i.e., a stronger conjugate base will result in a closer equilibrium position for the hydronium ion.

Incremental water binding energies were calculated for the addition of the six water molecules to both sulfonic acids according to the relation:

$$\Delta E_b = E[\text{acid}(H_2O)_n] - E[H_2O] - E[\text{acid}(H_2O)_{n-1}]$$

where total electronic energies are those computed at the B3LYP/6-31G** level of theory. The numerical values are presented in Table 4. In comparing the two sulfonic acids, the binding energies generally demonstrate that the water molecules in the clusters with triflic acid are somewhat more loosely bound to the acid than with para-toluene sulfonic acid. It may also be observed that with the aromatic acid there is very little difference in the binding energies for the addition of the first 5 water molecules; the sixth water molecule is much more loosely bound having a substantially lower binding energy. The latter would suggest that the first hydration shell for p-toluene sulfonic acid probably also comprises 5 water molecules.

TABLE 4

Incremental binding energies (ΔBE) and standard free energies (ΔG°) (kcal/mol) for the addition of the n$^{th}$ water molecule to $CF_3SO_3H$ and $CH_3C_6H_4SO_3H$

| Number of Water Molecules, n | $CF_3SO_3H$ ΔBE | $CF_3SO_3H$ ΔG° | $CH_3C_6H_4SO_3H$ ΔBE | $CH_3C_6H_4SO_3H$ ΔG° |
|---|---|---|---|---|
| 1 | −17.4 | −5.6 | −16.1 | −3.7 |
| 2 | −15.6 | −5.3 | −16.7 | −7.0 |
| 3 | −21.0 | −6.1 | −16.4 | −1.5 |
| 4 | −16.6 | −4.4 | −16.0 | −5.2 |
| 5 | −20.3 | −6.6 | −16.2 | −2.0 |
| 6 | −19.2 | −5.6 | −21.3 | −7.2 |

The change in the standard Gibbs free energy for the reactions are also tabulated in Table 4. These were calculated from G°'s computed with G98 (Gaussian 98, Revision A.9; available from Gaussian Inc., Pittsburgh, Pa., USA) employing the harmonic oscillator approximation. It is interesting to note that only relatively small fluctuations are observed in the ΔG°'s for triflic acid while the ΔG°'s computed for the toluene sulfonic acid show substantial variance. Comparing these free energy changes reveals that the dissociation of the proton (n=3 for both acids) is much more favorable in the perfluorinated acid (∼−6.1 vs. ∼−1.5 kcal/mol).

Friction and diffusion coefficients were computed for both NAFION 117 and 65% sulfonated PEEKK membranes at ambient temperature (298.15 K), each at three distinct hydration concentrations. The input parameters needed in these computations were taken from small-angle X-ray scattering (SAXS) measurements. See, for example, K. D. Kreuer, *J. Membr. Sci.* 185, 29 (2001); M. Ise, *Ph.D. Thesis*, University of Stuttgart (2000); and T. D. Gierke et al., *J. Polym. Sci. Polym. Phys.* 19, 1687 (1981). This information is presented in Table 5 and includes: the radius of the pore R, the length of the pore L, the total number of water molecules in the pore N, the total number of fixed sites in the pore $f_s$, the number of axially positioned radially symmetric arrays of sulfonate groups n, the average separation distance of the sulfonate groups $d_{SO_3^-}$, the average radial distance the hydronium ion is from the sulfonate groups r, and the amplitude of the periodic potential $\Psi_o$. The numerical value of the last parameter is generally based on the assumption that the dominant contribution to the proton mobility is typically due to the hydronium ion moving along the center of the pore.

The choice of the 'base value' of the friction coefficient $\zeta_1$ is generally based on consideration of the permittivity of the water in the pore. The numerical value of $\zeta_1$ was taken to be either that computed with the Stokes relation for a hydronium ion in bulk water (~2.69E-12 kg/s), or that derived from experimental diffusion measurements of a proton in bulk water (~4.42E-13 kg/s). See, for example, David R. Lide, Ed., *Handbook of Chemistry and Physics*, $80^{th}$ Ed. 5–94, CRC Press, Boca Raton (1999). For membrane hydration levels where the water in the pores is relatively bound through hydrophilic/electrostatic interactions with the —$SO_3^-$ groups, the proton is transported as $H_3O^+$ suggesting the appropriateness of the former value of $\zeta_1$. For membranes at higher water concentrations, where the water in the pores is more like bulk water, transport of the proton occurs (at least to some extent) through transfer from water molecule to water molecule (i.e., the Grotthuss mechanism); and therefore, the latter value for $\zeta_1$ is used as the applicable value.

A model using an equilibrium statistical mechanical formulation was developed to compute the permittivity of

TABLE 5

Transport model input parameters for NAFION and 65% sulfonated PEEKK membrane pores

| Parameter: | NAFION 117 | NAFION 117 | NAFION 117 | 65% sulfonated PEEKK | 65% sulfonated PEEKK | 65% sulfonated PEEKK |
|---|---|---|---|---|---|---|
| $\lambda$ | 6 | 13 | 22.5 | 15 | 23 | 30 |
| R, Å | 8 | 14 | 16 | 7 | 9.5 | 12 |
| L, Å | 30 | 56 | 64 | 40 | 48 | 56 |
| N | 216 | 1001 | 1800 | 375 | 828 | 1470 |
| $f_s$ | 36 | 77 | 80 | 25 | 36 | 49 |
| n | 6 | 8 | 8 | 5 | 6 | 7 |
| $d_{SO_3}$, Å | 6 | 7 | 8 | 9 | 9 | 9 |
| r, Å | 4 | 10 | 12 | 6.4 | 9 | 11 |
| $\Psi_o$, J | 5.17E−22 | 2.10E−23 | 4.67E−24 | 3.63E−22 | 3.69E−23 | 7.48E−24 |

Examination of the parameters in Table 5 generally demonstrates that at similar degrees of hydration, the NAFION membrane pores comprise substantially larger diameters. It also may be observed that with increasing membrane hydration, the size of the water-ion domains (e.g., pores) increases beyond that due solely to the increase in the number of water molecules associated with each fixed site. This trend is generally demonstrated for the perfluorinated and aromatic membranes and is tracked by observing the increase in the value of the total number of fixed sides $f_s$ and the total number of water molecules N. With the aromatic membranes, the average separation distance of the sulfonate groups remains relatively constant (e.g., ~9 Å) over the range of hydration. This, however, is generally not observed for the NAFION membranes, where with increasing hydration there is typically an increase in the separation of the fixed sites. It is also notable that the amplitude of the electrostatic field due to the presence of the anionic groups along the walls of the pore ranges over nearly two orders of magnitude. Accordingly, it may be appreciated that the increase in the radius of the pore has a substantial impact on the electrostatic field experienced by a hydronium ion moving along the center of the pore.

Friction coefficient correction terms ($\zeta_2$, $\zeta_3$, $\zeta_4$) were computed at equally spaced intervals of 1 Å along the length of each pore. Average values of these correction terms, along with the selected 'base value' of the friction coefficient $\zeta_1$ were then used to calculate the proton diffusion coefficient.

water in PEM pores as a function of: (1) pore size; (2) distribution of the fixed sites; and (3) radial separation distance of the proton from the anionic groups. See, for example, R. Paul and S. J. Paddison, *J. Chem. Phys.* 115, 7762 (2001). The permittivity of water in the pores of NAFION membranes at water concentrations of $\lambda$=6, 13, 22.5 suggest that much of the water at the two lower water concentrations is bound through interaction with the —$SO_3^-$ fixed sites. This is in contrast to the results computed for fully hydrated NAFION where a significant portion of the water is similar to bulk water. With these results, the value for $\zeta_1$ at the two lower hydration states was taken to be that derived with the Stokes relation and for that at the highest water concentration, the value derived from experimental proton diffusion measurements in bulk water.

Figure 7:
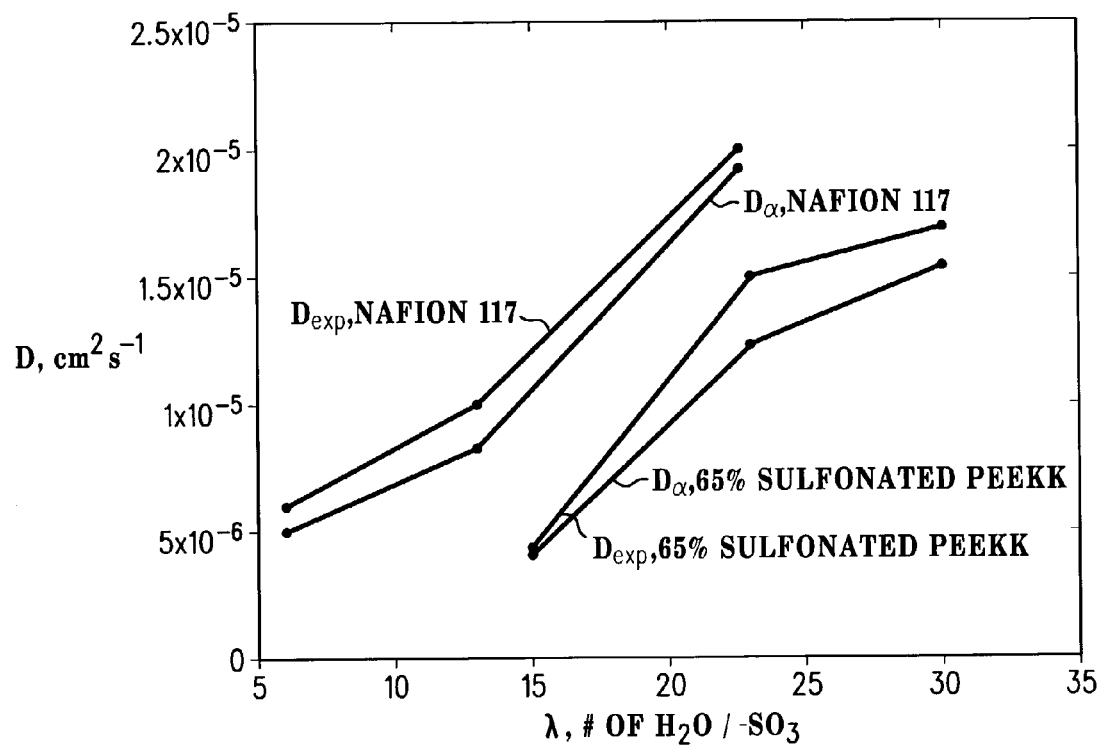
FIG. 7 representatively illustrates the computed and experimental proton diffusion coefficients for NAFION 117 and 65% sulfonated PEEKK as a function of hydration water content in accordance with one exemplary aspect of the instant invention.

Computed proton diffusion coefficient $D_\alpha$ for NAFION membranes are compared with experimentally measure values $D_{exp}$ in the plot representatively depicted, for example, in FIG. 7. For experimental values see, for example, K. D. Kreuer, *J. Membr. Sci.* 185, 29 (2001); M. Ise, *Ph.D. Thesis*, University of Stuttgart (2000); and T. A. Zawodzinski et al., *Electrochim. Acta* 40, 297 (1995). This comparison reveals that in all cases the calculated values are slightly lower (specifically, from about 8% to about 15% lower) than the experimental values. Accordingly, the agreement with experiment is quite good—on the order of within the error of the measurements. While no contribution from intermolecular (water-water) proton transfer was included in the calculation of proton diffusion coefficients for the NAFION membrane pores (at λ=6 and 13), this was included for the fully hydrated membrane (i.e., λ~22.5) in the choice of $\zeta_1$.

A similar criteria and procedure were used to select a value for $\zeta_1$ for PEEKK membranes at each hydration concentration. The results indicated that the relative permittivity of the water in the center of a pore at the lowest water concentration (i.e., λ=15) is on the order of about 67—approximately 16% less than that of bulk water; while at the two higher water concentrations, the permittivity of the water is about 80, even for distances of up to 1.5 Å from the center of the pore. Based on these results, $\zeta_1$ was taken to be the value computed with the Stokes relation for a hydronium ion in bulk water (~2.69E-12 kg/s) for λ=15, and that derived from experimental diffusion measurements of a proton in bulk water (~4.42E-13 kg/s) for λ=23 and 30.

Figure 6:
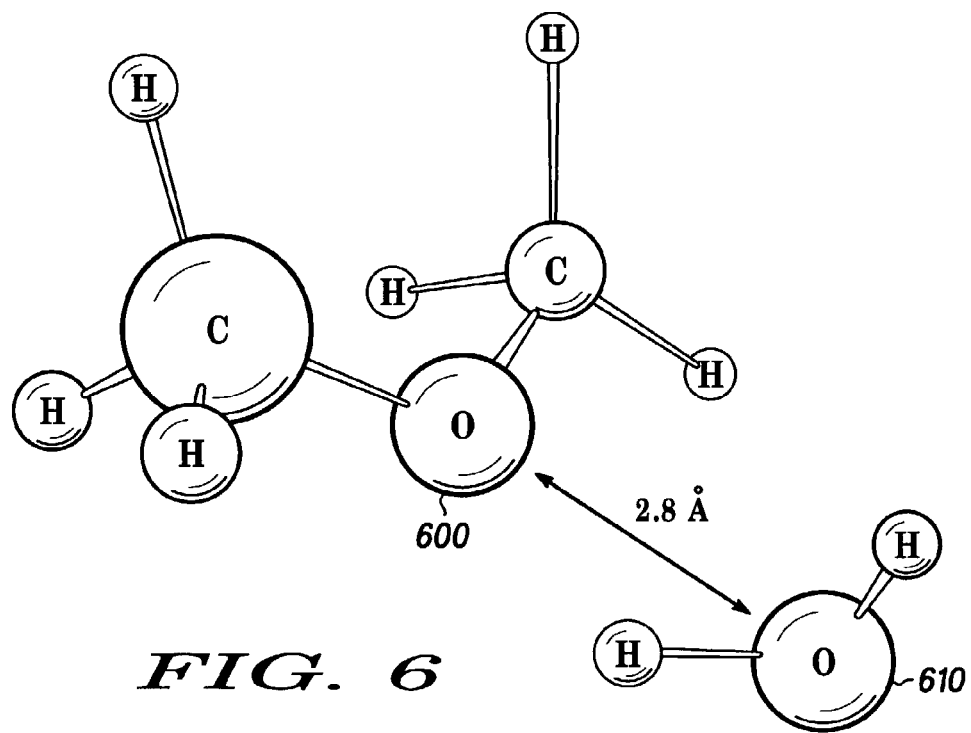
FIG. 6 representatively illustrates the oxygen-oxygen distance for an energy-minimized interaction between a water molecule and dimethyl ether.

The computed proton diffusion coefficients for the 65% sulfonated PEEKK membranes are also representatively plotted in FIG. 6 along with the corresponding experimentally measured values. See, for example, K. D. Kreuer, *J. Membr. Sci.* 185, 29 (2001); and M. Ise, *Ph.D. Thesis*, University of Stuttgart (2000). Again, agreement with pulsed field gradient NMR measurements is good with the calculated values slightly lower than the experimental values.

This consistent result of the calculated values being smaller than the experimental values suggests that the exemplary embodiment disclosed vide supra may over-estimate the effect of the $-SO_3^-$ groups in retarding the mobility of the proton. The electrostatic field generated by the anionic fixed sites is perhaps too high due to the neglect of the presence of the additional protons. Accordingly, these protons will generally increase the shielding over that due from the water molecules of the hydronium ion from interaction with $SO_3^-$ groups and reduce the effects of the latter on the water molecules in the pore. Thus, inclusion of additional protons in alternative exemplary embodiments in accordance with the instant invention would tend to provide a decrease in the magnitudes of the computed friction coefficient correction terms and a consequent increase in the calculated proton diffusion coefficient. The main reason the presence of additional protons were not included in the representative transport model in accordance with the exemplary embodiment disclose vide supra was due inter alia to the distribution of these protons not having been characterized to a relatively degree of certainty. While the prior art has assumed a Boltzmann distribution for the protons within the pore (see, for example, M. Eikerling et al., *J. Phys. Chem. B* 105, 3646 (2001); and M. Eikerling et al., *J. Phys. Chem.* 101, 10807 (1997)), an exemplary embodiment of the present invention demonstrates that the prior art approach generally neglects proton dissociation effects due to differences in conjugate anionic bases. Moreover, such a continuum distribution would tend to over-estimate shielding effects in pores with radii of less than two Debye lengths. Nevertheless, inclusion of additional protons in the model would be considered to provide improved results in alternative exemplary embodiments, and those skilled in the art will appreciate that the same are within the scope and ambit of the present invention.

Differential Sidechain Chemistry

Figure 4:
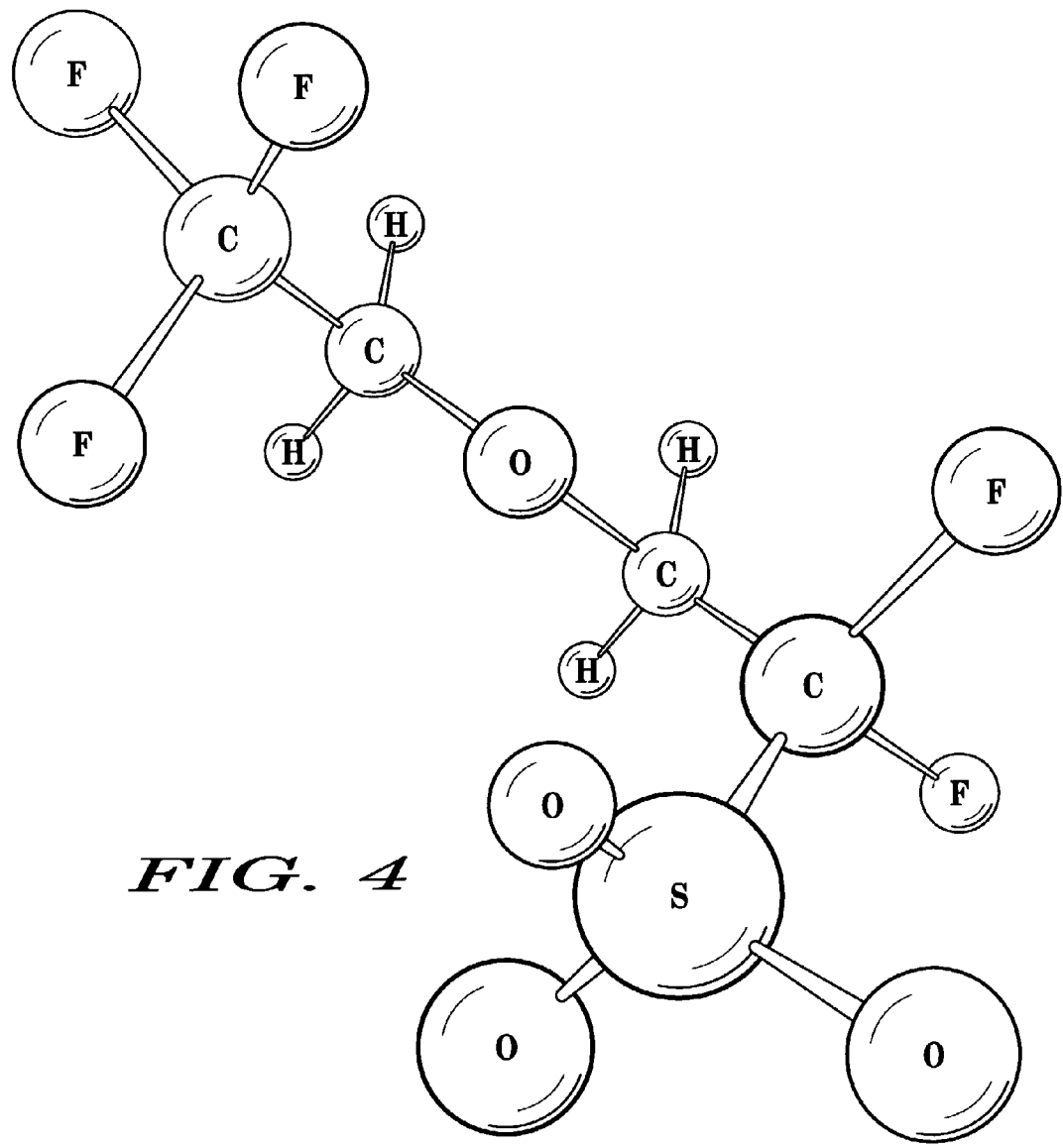
FIG. 4 representatively illustrates an energy-minimized chemical structure for a monomeric moiety corresponding to a novel ionomeric compound in accordance with an exemplary embodiment of the present invention.
Figure 5:
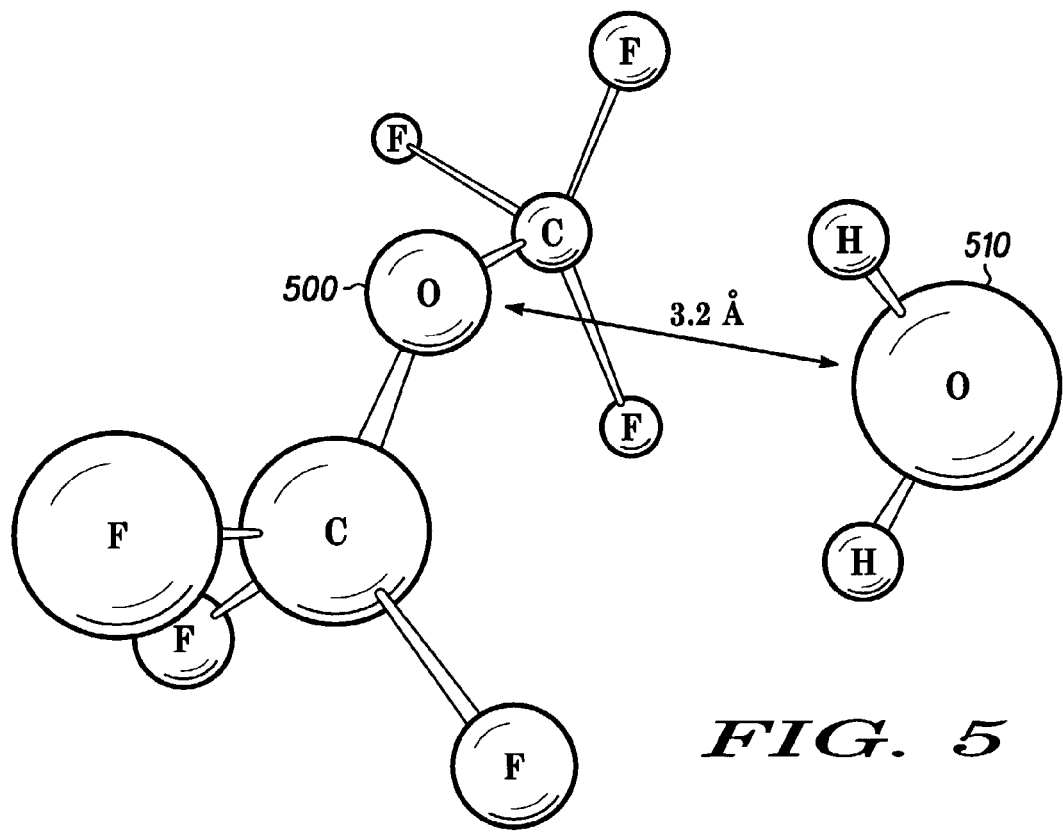
FIG. 5 representatively illustrates the oxygen-oxygen distance for an energy-minimized interaction between a water molecule and di-trifluoromethane ether.

Di-trifluoromethane ether was selected as a canonical representation for the ether sidechain linkage of NAFION and a first candidate structure. Ab Initio calculations at the B3LYP/6-31G** level of theory were undertaken for the fluoro-ether candidate moiety in vacuo as well as with one water of hydration. As generally depicted, for example, in FIG. 5, the O—O distance between the fluoro-ether oxygen 500 and the oxygen of the water 510 was determined to be 3.2 Å. A second candidate moiety corresponding to dimethyl ether was selected and optimized at the same level of theory, both in vacuo and with one water of hydration. As generally depicted, for example, in FIG. 6, the O—O distance between the dimethyl ether oxygen 600 and the oxygen of the water 610 was 2.8 Å. Accordingly, the dimethyl ether system was considered to present a higher hydrophilicity relative to the fluoro-ether candidate moiety (e.g., the canonical representation for the NAFION sidechain). This consequently motivated the alteration of the NAFION sidechain to yield the novel ionomeric composition of matter as generally depicted, for example, in FIG. 4; wherein the $-CF_2$ groups geminal to the ether sidechain linkage of NAFION are substituted with $-CH_2$ groups.

Figure 8:
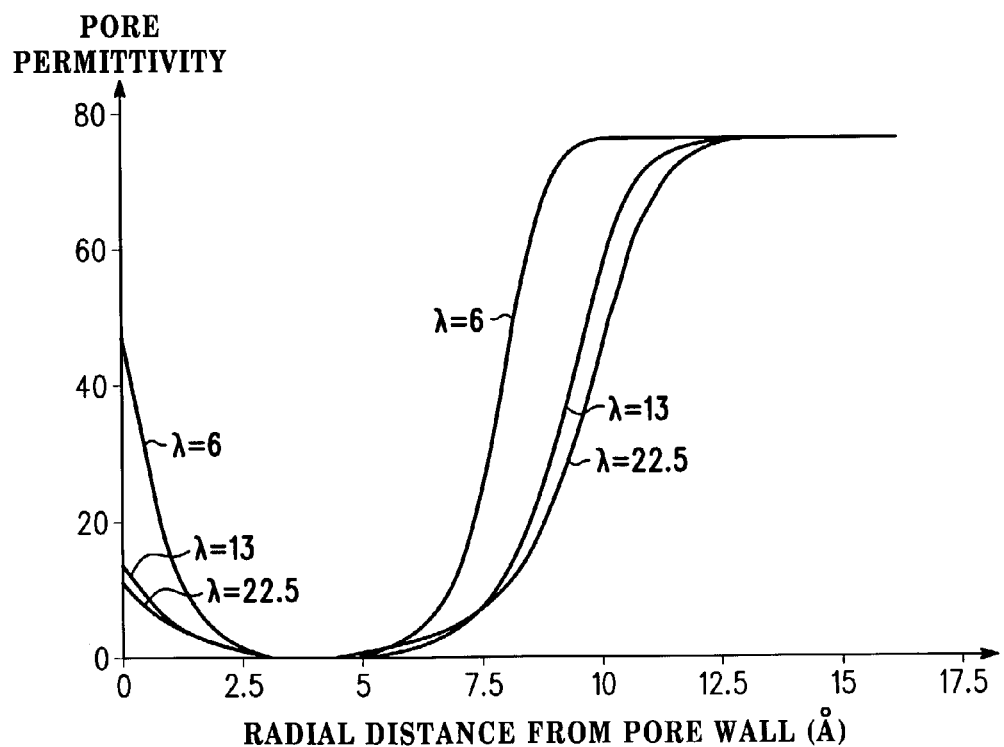
FIG. 8 representatively illustrates the relative permittivity of water in NAFION 117 as a function of the radial distance from the pore wall and hydration water content in accordance with another exemplary aspect of the instant invention.
Figure 9:
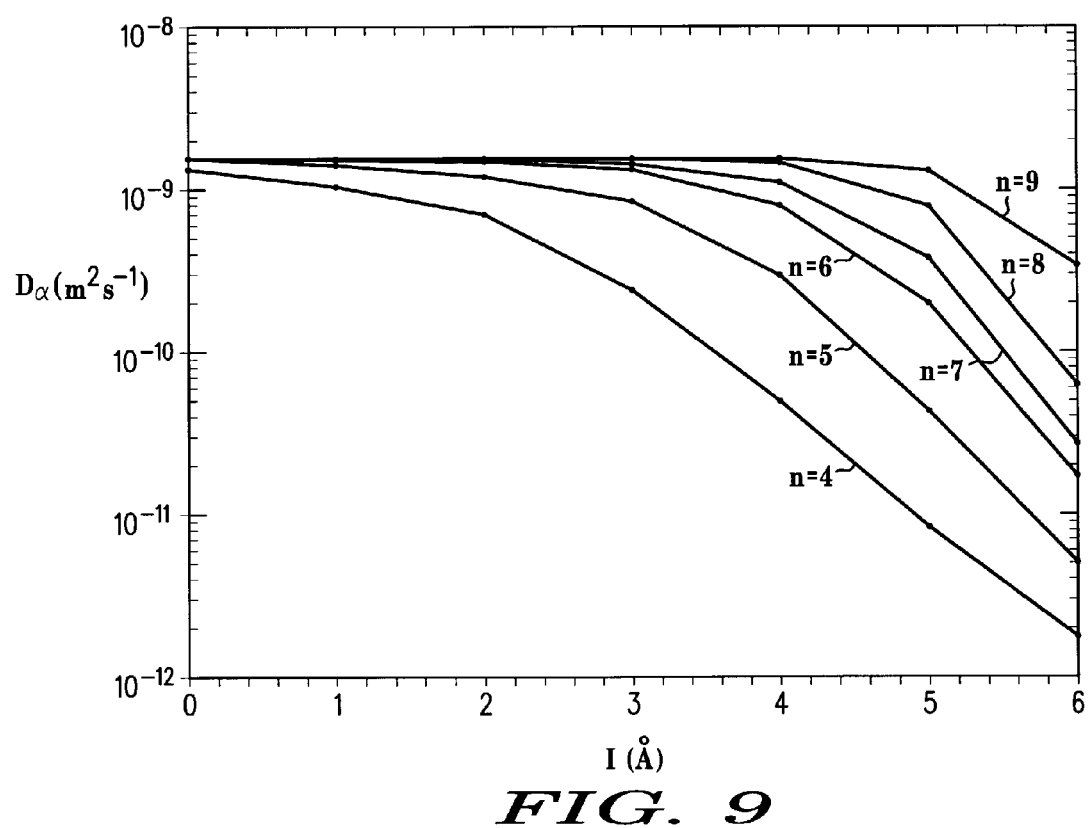
FIG. 9 representatively illustrates the parametric sensitivity of proton diffusion as a function of the length of sidechain pore intrusion in accordance with yet another embodiment of the present invention.

Statistical mechanical characterization of proton transport, as described vide supra, for NAFION yielded the relative permittivity values of water as a function of hydration order and radial distance from the pore wall, as generally depicted, for example, in FIG. 8; as well as the parametric sensitivity of proton diffusion as a function of the length of sidechain pore intrusion, as generally depicted, for example, in FIG. 9. Similar characterization for the novel ionomeric composition of matter representatively depicted in FIG. 4 demonstrated increased sidechain pore intrusion with a substantial increase in the tendency of the ether oxygen to form a hydrogen bond with water. Additionally, modeling of the permittivity of the water in the pores of the novel ionomeric material in accordance with one exemplary embodiment of the present invention, demonstrated that the character of the water was altered so as to inhibit the transport of the water by the protonic current, thereby preventing or otherwise ameliorating the electro-osmotic drag from increasing. Additionally, since the hydrophilicity of the sidechains in alternative exemplary embodiments may be tailored so as to make the terminal moiety more hydrophilic than along the length of the sidechain, the conductivity of the membrane at lower water concentrations will typically not be reduced with increasing hydrophilicity of the sidechain.

The present invention may be described herein in terms of various processing steps. It should be appreciated that such processing steps may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices.

Similarly, the software elements of the present invention may be implemented with any programming or scripting language such as, for example, Fortran, HPFortran, C, C++, Java, COBOL, assembler, PERL, eXtensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, parallelization, distributed processing, network control, and the like. Still further, the invention may employ various security measures to prevent or otherwise deter, for example, code de-compilation with inter alia client-side scripting languages, such as JavaScript, VBScript and/or the like.

Alternatively, conjunctively or sequentially, the present invention may also employ cryptographic features designed to protect access to data files and/or de-compilation of executable code. For a basic introduction of cryptography, please review, for example, the text written by Bruce Schneider entitled "Applied Cryptography: Protocols, Algorithms, And Source Code In C," published by John Wiley & Sons (second edition, 1996).

It should be appreciated that the particular implementations shown and described herein are illustrative of the invention and its best mode and are not intended to otherwise limit the scope of the present invention in any way. Indeed, for the sake of brevity, conventional data processing, application development and other functional aspects of the systems (and components of the individual operating components of the systems) may not be described in detail herein. Furthermore, data processing components of various embodiments in accordance with the present invention are intended to provide exemplary functional relationships and/or couplings between the various elements. It should be noted that many alternative or additional functional relationships or physical connections may be present in a practical system.

It will be appreciated, that many applications of the present invention may be formulated. One skilled in the art will appreciate, for example, that a distributed processing architecture may include any system for exchanging data, such as, for example, the Internet, an intranet, an extranet, WAN, LAN, satellite communications, and/or the like. It is noted that a network may be implemented as other types of networks, such as an interactive television (ITV) network as well. The users may interact with the system via any input device such as a keyboard, mouse, kiosk, personal digital assistant, handheld computer (e.g., PalmPilot®), cellular phone and/or the like. Similarly, the invention could be used in conjunction with any type of personal computer, network computer, workstation, minicomputer, mainframe, or the like running any operating system such as any version of Windows, Windows XP, Windows ME, Windows NT, Windows2000, Windows 98, Windows 95, MacOS, OS/2, BeOS, Linux, UNIX, or any operating system now known or hereafter derived by those skilled in the art. Moreover, the invention may be readily implemented with TCP/IP communications protocols, IPX, Appletalk, IP-6, NetBIOS, OSI or any number of existing or future protocols. Moreover, the system contemplates the use, sale and/or distribution of any goods, services or information having similar functionality described herein.

The computing units may be connected with each other via a data communication network. The network may be a public network and assumed to be insecure and open to eavesdroppers. In one exemplary implementation, the network may be embodied as the Internet. In this context, the computers may or may not be connected to the Internet at all times. Specific information related to data traffic protocols, standards, and application software utilized in connection with the Internet may be obtained, for example, from Dilip Naik, Internet Standards and Protocols (1998); Java2 Complete, various authors, (Sybex 1999); Deborah Ray and Eric Ray, Mastering HTML 4.0 (1997). Loshin, TCP/IP Clearly Explained (1997). A variety of conventional communications media and protocols may be used for data links, such as, for example, a connection to an Internet Service Provider (ISP), over the local loop as is typically used in connection with standard modem communication, cable modem, Dish networks, ISDN, Digital Subscriber Line (DSL), or various wireless communication methods. Data processing systems in accordance with the present invention might also reside within a local area network (LAN) which interfaces to a network via a leased line (T1, T3, etc.). Such communication methods are well known in the art, and are covered in a variety of standard texts. See, e.g., Gilbert Held, Understanding Data Communications (1996), hereby incorporated by reference.

As will be appreciated by one of ordinary skill in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication may be accomplished through any suitable communication means, such as, for example, a telephone network, intranet, Internet, point of interaction device (personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

Where the instant invention embodies a method for performing the various tasks disclosed herein as a software embodiment, computer program instructions may be loaded onto a general purpose computer, special purpose computer, or other programmable data processing apparatus to produce a machine, such that the instructions which execute on the computer or other programmable data processing apparatus create means for implementing the functions specified in the disclosed methods. These computer program instructions may also be stored in a computer-readable memory capable of directing a computer or other programmable data processing apparatus to function in a particular manner, such that the instructions stored in the computer-readable memory produce an article of manufacture including instruction means which implement the functions specified in the disclosed method steps. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the variously disclosed method steps.

Accordingly, the disclosed method steps support combinations of means for performing the specified functions, combinations of steps for performing the specified functions, and program instruction means for performing the specified functions. It will also be understood that each disclosed method step and combinations of method steps may be implemented by either special purpose hardware-based computer systems which perform the specified functions or steps, or suitable combinations of special purpose hardware and computer instructions.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

We claim:

1. A method for characterizing a polymer electrolyte membrane material suitably adapted for the reduction of electro-osmotic drag upon at least partial hydration of said membrane, said method comprising the steps of:
   providing a candidate chemical structure for a first ionomer;
   providing a candidate chemical structure for a second ionomer;
   calculating the quantum mechanical electronic structure of said first candidate ionomer in order to characterize an at least partially optimized molecular conformation for said first ionomer;
   solvating said at least partially optimized first ionomer with at least one water molecule and calculating the quantum mechanical electronic structure for the corresponding solvated system in order to characterize a first value, said first value at least proportional to the hydrophilicity of at least a chemically functional moiety of said at least partially optimized first ionomer;
   characterizing the transport of protonic species within the at least partially optimized first candidate ionomeric material by statistical mechanical determination of a first effective friction coefficient for a hydronium ion in a water-filled first pore of said at least partially optimized first candidate ionomeric material, said first pore comprising an effectively non-uniform charge distribution on the walls of said first pore;
   calculating the quantum mechanical electronic structure of said second candidate ionomer in order to characterize an at least partially optimized molecular conformation for said second ionomer;
   solvating said at least partially optimized second ionomer with at least one water molecule and calculating the quantum mechanical electronic structure for the corresponding solvated system in order to characterize a second value, said second value at least proportional to the hydrophilicity of at least a chemically functional moiety of said at least partially optimized second ionomer;
   characterizing the transport of protonic species within the at least partially optimized second candidate ionomeric material by statistical mechanical determination of a second effective friction coefficient for a hydronium ion in a water-filled second pore of said at least partially optimized second candidate ionomeric material, said second pore comprising an effectively non-uniform charge distribution on the walls of said second pore; and
   comparing at least one of: said first value with said second value; and said first friction coefficient with said second friction coefficient to determine which of said first candidate ionomeric material and said second candidate ionomeric material demonstrates a lower electro-osmotic drag.

2. The method for characterizing a polymer electrolyte membrane material suitably adapted for the reduction of electro-osmotic drag of claim 1, wherein said first candidate ionomer comprises at least one of NAFION and PEEKK.

3. The method for characterizing a polymer electrolyte membrane material suitably adapted for the reduction of electro-osmotic drag of claim 1, wherein said second candidate ionomer comprises a chemically modified version of said first candidate ionomer.

4. The method for characterizing a polymer electrolyte membrane material suitably adapted for the reduction of electro-osmotic drag of claim 3, wherein said chemical modification comprises alteration of the sidechain of said first ionomer to produce said second ionomer, wherein the hydrophilicity of the sidechain of said second ionomer is at least greater than the hydrophilicity of the sidechain of said first ionomer.

5. The method for characterizing a polymer electrolyte membrane material suitably adapted for the reduction of electro-osmotic drag of claim 4, wherein said first ionomer comprises at least one of NAFION and PEEKK.

6. The method for characterizing a polymer electrolyte membrane material suitably adapted for the reduction of electro-osmotic drag of claim 1, wherein said method steps comprise computer implemented data processing procedures.

7. The method of characterizing a polymer electrolyte membrane material suitably adapted for the reduction of electro-osmotic drag of claim 6, wherein said computer implemented data processing procedures comprise a substantially unitary software application.

8. The method of characterizing a polymer electrolyte membrane material suitably adapted for the reduction of electro-osmotic drag of claim 6, wherein said software application resides on a digital computer system.

9. The method of characterizing a polymer electrolyte membrane material suitably adapted for the reduction of electro-osmotic drag of claim 1, wherein the results of said comparison of at least one of: said first value with said second value; and said first friction coefficient with said second friction coefficient to determine which of said first candidate ionomeric material and said second candidate ionomeric material demonstrates a lower electro-osmotic drag are used to motivate the proposal of a structurally different third candidate ionomeric material for further analysis.

10. The method for characterizing a polymer electrolyte membrane material suitably adapted for the reduction of electro-osmotic drag of claim 9, further comprising the steps of:

calculating the quantum mechanical electronic structure of said third candidate ionomer in order to characterize an at least partially optimized molecular conformation for said third ionomer;

solvating said at least partially optimized third ionomer with at least one water molecule and calculating the quantum mechanical electronic structure for the corresponding solvated system in order to characterize a third value, said third value at least proportional to the hydrophilicity of at least a chemically functional moiety of said at least partially optimized third ionomer;

characterizing the transport of protonic species within the at least partially optimized third candidate ionomeric material by statistical mechanical determination of a third effective friction coefficient for a hydronium ion in a water-filled third pore of said at least partially optimized third candidate ionomeric material, said third pore comprising an effectively non-uniform charge distribution on the walls of said third pore; and comparing at least one of: at least one of said first value and said second value with said third value; and at least one of said first friction coefficient and said second friction coefficient with said third friction coefficient to determine which of said first candidate ionomeric material, said second candidate ionomeric material, and said third candidate ionomeric material demonstrates a lower electro-osmotic drag.

* * * * *